US 12,375,215 B2

(12) United States Patent
He et al.

(10) Patent No.: US 12,375,215 B2
(45) Date of Patent: Jul. 29, 2025

(54) METHOD AND APPARATUS FOR CONFIGURATION OF RESOURCE SENSING IN NR V2X RESOURCE ALLOCATION

(71) Applicant: Samsung Electronics Co., Ltd., Suwon-si (KR)

(72) Inventors: Chao He, Allen, TX (US); Aris Papasakellariou, Houston, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/467,696

(22) Filed: Sep. 14, 2023

(65) Prior Publication Data

US 2024/0007230 A1 Jan. 4, 2024

Related U.S. Application Data

(63) Continuation of application No. 17/575,553, filed on Jan. 13, 2022, now Pat. No. 11,764,909, which is a
(Continued)

(51) Int. Cl.
*H04W 76/11* (2018.01)
*H04L 1/00* (2006.01)
(Continued)

(52) U.S. Cl.
CPC .......... *H04L 1/1819* (2013.01); *H04L 1/0061* (2013.01); *H04L 5/0055* (2013.01);
(Continued)

(58) Field of Classification Search
CPC ... H04L 1/1819; H04L 1/0061; H04L 5/0055; H04W 76/11; H04W 4/40; H04W 72/042; H04W 92/18
See application file for complete search history.

(56) References Cited

U.S. PATENT DOCUMENTS 11,233,607 B2 * 1/2022 He ..................... H04L 5/0055
11,271,699 B1 * 3/2022 Eyuboglu ............ H04L 1/1819
(Continued)

FOREIGN PATENT DOCUMENTS

CN 108632781 A 10/2018
CN 109644174 A 4/2019
(Continued)

OTHER PUBLICATIONS

Korean Intellectual Property Office, Final Office Action issued Aug. 19, 2024 regarding Application No. 10-2021-7028366, 8 pages.
(Continued)

*Primary Examiner* — Michael J Moore, Jr.

(57) ABSTRACT

A method for a user equipment (UE) to provide hybrid automatic repeat request acknowledgement (HARQ-ACK) information includes transmitting physical sidelink shared channels (PSSCHs), where each of the PSSCH transmissions provides a transport block (TB); receiving physical sidelink feedback channels (PSFCHs); and generating values for HARQ-ACK information bits from the PSFCH receptions. The PSFCH receptions correspond to the PSSCH transmissions and the values of the HARQ-ACK information bits correspond to the TBs in the PSSCH transmissions. The method further includes generating a HARQ-ACK codeword that includes the values of the HARQ-ACK information bits arranged in a predetermined order and transmitting the HARQ-ACK codeword in a physical uplink control channel (PUCCH).

20 Claims, 26 Drawing Sheets

Related U.S. Application Data continuation of application No. 16/847,416, filed on Apr. 13, 2020, now Pat. No. 11,233,607.

(60) Provisional application No. 62/887,203, filed on Aug. 15, 2019, provisional application No. 62/887,176, filed on Aug. 15, 2019, provisional application No. 62/884,477, filed on Aug. 8, 2019, provisional application No. 62/872,407, filed on Jul. 10, 2019, provisional application No. 62/860,344, filed on Jun. 12, 2019, provisional application No. 62/835,644, filed on Apr. 18, 2019.

(51) Int. Cl.

| | | |
|---|---|---|
| *H04L 1/1812* | (2023.01) | |
| *H04L 5/00* | (2006.01) | |
| *H04W 4/40* | (2018.01) | |
| *H04W 72/23* | (2023.01) | |
| *H04W 92/18* | (2009.01) | |

(52) U.S. Cl.
CPC ............. *H04W 4/40* (2018.02); *H04W 72/23* (2023.01); *H04W 76/11* (2018.02); *H04W 92/18* (2013.01)

(56) References Cited

U.S. PATENT DOCUMENTS

| | | | | |
|---|---|---|---|---|
| 11,737,072 | B2* | 8/2023 | Kim | H04W 72/046 370/329 |
| 11,764,909 | B2* | 9/2023 | He | H04L 1/1819 370/329 |
| 2019/0173612 | A1 | 6/2019 | Kimura | |
| 2019/0174466 | A1* | 6/2019 | Zhang | H04L 5/0057 |
| 2020/0053702 | A1* | 2/2020 | Cheng | H04L 1/08 |
| 2020/0053835 | A1* | 2/2020 | Ye | H04L 1/08 |
| 2020/0112400 | A1* | 4/2020 | Lee | H04L 1/1819 |
| 2020/0112982 | A1* | 4/2020 | Li | H04W 72/23 |
| 2020/0163155 | A1 | 5/2020 | Lee | |
| 2020/0221271 | A1* | 7/2020 | Kim | H04L 5/0053 |
| 2020/0228247 | A1* | 7/2020 | Guo | H04L 1/0025 |
| 2020/0229104 | A1* | 7/2020 | MolavianJazi | H04W 52/146 |
| 2020/0266857 | A1 | 8/2020 | Hwang | |
| 2020/0267048 | A1* | 8/2020 | Yu | H04B 7/0695 |
| 2020/0280398 | A1* | 9/2020 | Hwang | H04L 5/0078 |
| 2020/0288435 | A1* | 9/2020 | Kwak | H04L 5/0094 |
| 2020/0314819 | A1* | 10/2020 | Loehr | H04W 4/40 |
| 2020/0322095 | A1* | 10/2020 | Park | H04W 4/40 |
| 2020/0336253 | A1* | 10/2020 | He | H04W 76/11 |
| 2020/0359375 | A1* | 11/2020 | Hwang | H04L 1/1854 |
| 2021/0126744 | A1* | 4/2021 | Hwang | H04L 5/0055 |
| 2021/0282099 | A1* | 9/2021 | Osawa | H04L 5/0048 |
| 2021/0288778 | A1* | 9/2021 | Park | H04L 1/1854 |
| 2021/0297221 | A1* | 9/2021 | Lee | H04L 5/0053 |
| 2021/0314045 | A1* | 10/2021 | Cha | H04W 16/28 |
| 2021/0345363 | A1* | 11/2021 | Zhang | H04W 72/569 |
| 2021/0368372 | A1* | 11/2021 | Chen | H04W 24/08 |
| 2021/0410165 | A1* | 12/2021 | Xiong | H04L 5/001 |
| 2022/0007403 | A1* | 1/2022 | Li | H04L 1/08 |
| 2022/0085923 | A1* | 3/2022 | Ye | H04W 72/02 |
| 2022/0094481 | A1* | 3/2022 | Hong | H04L 1/1812 |
| 2022/0104206 | A1* | 3/2022 | Lee | H04W 72/23 |
| 2022/0167180 | A1* | 5/2022 | Choi | H04L 1/1671 |
| 2022/0190892 | A1* | 6/2022 | Park | H04L 27/26 |
| 2022/0191733 | A1* | 6/2022 | Ali | H04W 4/46 |
| 2022/0191896 | A1* | 6/2022 | Panteleev | H04W 72/0446 |
| 2022/0210747 | A1* | 6/2022 | Lee | H04W 92/18 |
| 2023/0074337 | A1* | 3/2023 | Cheng | H04W 72/56 |
| 2024/0007230 | A1* | 1/2024 | He | H04L 5/0055 |

FOREIGN PATENT DOCUMENTS

| | | |
|---|---|---|
| WO | 2018174661 A1 | 9/2018 |
| WO | 2018203669 A1 | 11/2018 |
| WO | 2018204610 A2 | 11/2018 |
| WO | WO-2020125989 A1 * | 6/2020 |

OTHER PUBLICATIONS

"3rd Generation Partnership Project; Technical Specification Group Services and System Aspects; Study on enhancement of 3GPP Support for 5G V2X Services (Release 15)", 3GPP TR 22.886 V15.1.0, Mar. 2017, 58 pages.

"5G; NR; Overall description; Stage-2 (3GPP TS 38.300 version 15.4.0 Release 15)", ETSI TS 138 300 V15.4.0, Apr. 2019, 97 pages.

"5G; Study on scenarios and requirements for next generation access technologies (3GPP TR 38.913 version 14.3.0 Release 14)", ETSI TR 138 913 V14.3.0, Oct. 2017, 41 pages.

"RAN1 Chairmans Notes", 3GPP TSG RAN WG1 Meeting #94, Aug. 2018, 143 pages.

"RAN1 Chairmans Notes", 3GPP TSG RAN WG1 Meeting #94bis, Oct. 2018, 143 pages.

"RAN1 Chairmans Notes", 3GPP TSG RAN WG1 Meeting #95, Nov. 2018, 128 pages.

"RAN1 Chairmans Notes", 3GPP TSG RAN WG1 Meeting #96bis, Apr. 2019, 108 pages.

Chinese National Intellectual Property AdminisliaLion, Second Office Action regarding Application No. 202080006678.4, dated Jan. 10, 2022, 8 pages.

Ericsson, "Uu-based sidelink resource allocation", 3GPP TSG-RAN WG1 Meeting #96bis, Apr. 8-12, 2019, R1-1905476, 6 pages.

Extended European Search Report dated Oct. 28, 2021 regarding Application No. 20790826.0, 9 pages.

Huawei, "Feature lead summary for AI 7.2.4 7: NR control for LTE sidelink", 3GPP TSG RAN WG1 #96bis, R1-1905762, Apr. 2019, 4 pages.

Huawei, HiSilicon, "Sidelink physical layer procedures for NR V2X", 3GPP TSG RAN WG1 Meeting #96bis, Apr. 8-12, 2019, R1-1903944, 17 pages.

International Search Report dated Jul. 30, 2020 in connection with International Patent Application No. PCT/KR2020/005161, 3 pages.

Lenovo et al., "Support of NR Uu controlling LTE sidelink", 3GPP TSG RAN WG1 #96bis, R1-1904580, Apr. 2019, 3 pages.

Molina-Masegosa et al., "LTE-V for Sidelink 5G V2X Vehicular Communications: A New 5G Technology for Short-Range Vehicle-to-Everything Communications", IEEE Vehicular Technology Magazine, vol. 12, No. 4, Dec. 2017, pp. 30-39.

Samsung, "Considerations on Sidelink HARQ Procedure", 3GPP TSG RAN WG1 #96, Feb. 25-Mar. 1, 2019, R1-1902278, 11 pages.

Samsung, "On Uu-based resource allocation and configuration", 3GPP TSG RAN WG1 #96, Feb. 25-Mar. 1, 2019, R1-1902289, 7 pages.

VIVO, "Discussion on mode 1 resource allocation mechanism", 3GPP TSG RAN WG1 #96bis, R1-1904073, Apr. 2019, 9 pages.

Vodafone, "New SID: Study on NR V2X", 3GPP TSG RAN Meeting #80, RP-181480, (Update to RP-181429), Jun. 2018, 6 pages.

Written Opinion of the international Searching Authority dated Jul. 30, 2020 in connection with international Patent Application No. PCT/KR2020/005161, 5 pages.

Korean Intellectual Property Office, Office Action issued Dec. 11, 2023 regarding Application No. 10-2021-7028366, 9 pages.

* cited by examiner

METHOD AND APPARATUS FOR CONFIGURATION OF RESOURCE SENSING IN NR V2X RESOURCE ALLOCATION

CROSS-REFERENCE TO RELATED APPLICATIONS AND CLAIM OF PRIORITY

This application is a continuation of U.S. patent application Ser. No. 17/575,553, filed Jan. 13, 2022, which is a continuation of U.S. patent application Ser. No. 16/847,416, filed Apr. 13, 2020, now U.S. Pat. No. 11,233,607, which claims priority to U.S. Provisional Patent Application No. 62/835,644 filed Apr. 18, 2019, U.S. Provisional Patent Application No. 62/860,344 filed Jun. 12, 2019, U.S. Provisional Patent Application No. 62/872,407 filed Jul. 10, 2019, U.S. Provisional Patent Application No. 62/884,477 filed Aug. 8, 2019, U.S. Provisional Patent Application No. 62/887,203 filed Aug. 15, 2019, and U.S. Provisional Patent Application No. 62/887,176 filed Aug. 15, 2019, the disclosures of which are incorporated herein by reference in their entireties.

TECHNICAL FIELD

The present disclosure relates to resource sensing and to reporting of hybrid automatic repeat request acknowledgement (HARQ-ACK) information for sidelink communications according to New Radio Interface/Access (NR) radio access technology. More particularly, the present disclosure relates to symbol-based resource sensing, configuration for slot-based resource sensing, resource reservation, and adaptation of counter for sensing symbols and sensing slots, and to transmission of control channels with HARQ-ACK information in the sidelink and the uplink of a communication system.

BACKGROUND

5G New Radio Interface/Access (NR) systems support multiple services including enhanced mobile broadband (eMBB), massive machine type communication (mMTC), ultra-reliable low latency communication (uRLLC), and Vehicle-to-Everything (V2X) communication that is also referred to as sidelink communication. These services have enhanced features including higher data rates, higher operating frequency bands, wider bandwidths, greater reliability, shorter latency, and increased number of connections than in previous generations. V2X includes applications such as Vehicle-to-Vehicle (V2V) Communications, Vehicle-to-Infrastructure (V2I) Communications, and Vehicle-to-Pedestrian (V2P) Communications. These three types of V2X can use "co-operative awareness" to provide more intelligent services for end-users.

SUMMARY

The present disclosure relates to monitoring downlink control channels for communication with multiple transmission reception points.

In one embodiment, a method for a user equipment (UE) to provide hybrid automatic repeat request acknowledgement (HARQ-ACK) information. The method includes transmitting physical sidelink shared channels (PSSCHs), where each of the PSSCH transmissions provides a transport block (TB); receiving physical sidelink feedback channels (PSFCHs); and generating values for HARQ-ACK information bits from the PSFCH receptions. The PSFCH receptions correspond to the PSSCH transmissions, and the values of the HARQ-ACK information bits correspond to the TBs in the PSSCH transmissions. The method further includes generating a HARQ-ACK codeword that includes the values of the HARQ-ACK information bits arranged in a predetermined order and transmitting the HARQ-ACK codeword in a physical uplink control channel (PUCCH).

In another embodiment, a UE is provided. The UE includes a transceiver configured to transmit PSSCHs, where each of the PSSCH transmissions provides a TB, and receive PSFCHs. The UE also includes processor operably connected to the transceiver. The processor is configured to generate values for HARQ-ACK information bits from the PSFCH receptions. The PSFCH receptions correspond to the PSSCH transmissions. The values of the HARQ-ACK information bits correspond to the TBs in the PSSCH transmissions. The processor is further configured to generate a HARQ-ACK codeword that includes the values of the HARQ-ACK information bits arranged in a predetermined order. The transceiver is further configured to transmit the HARQ-ACK codeword in a PUCCH.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 30, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

Figure 1:
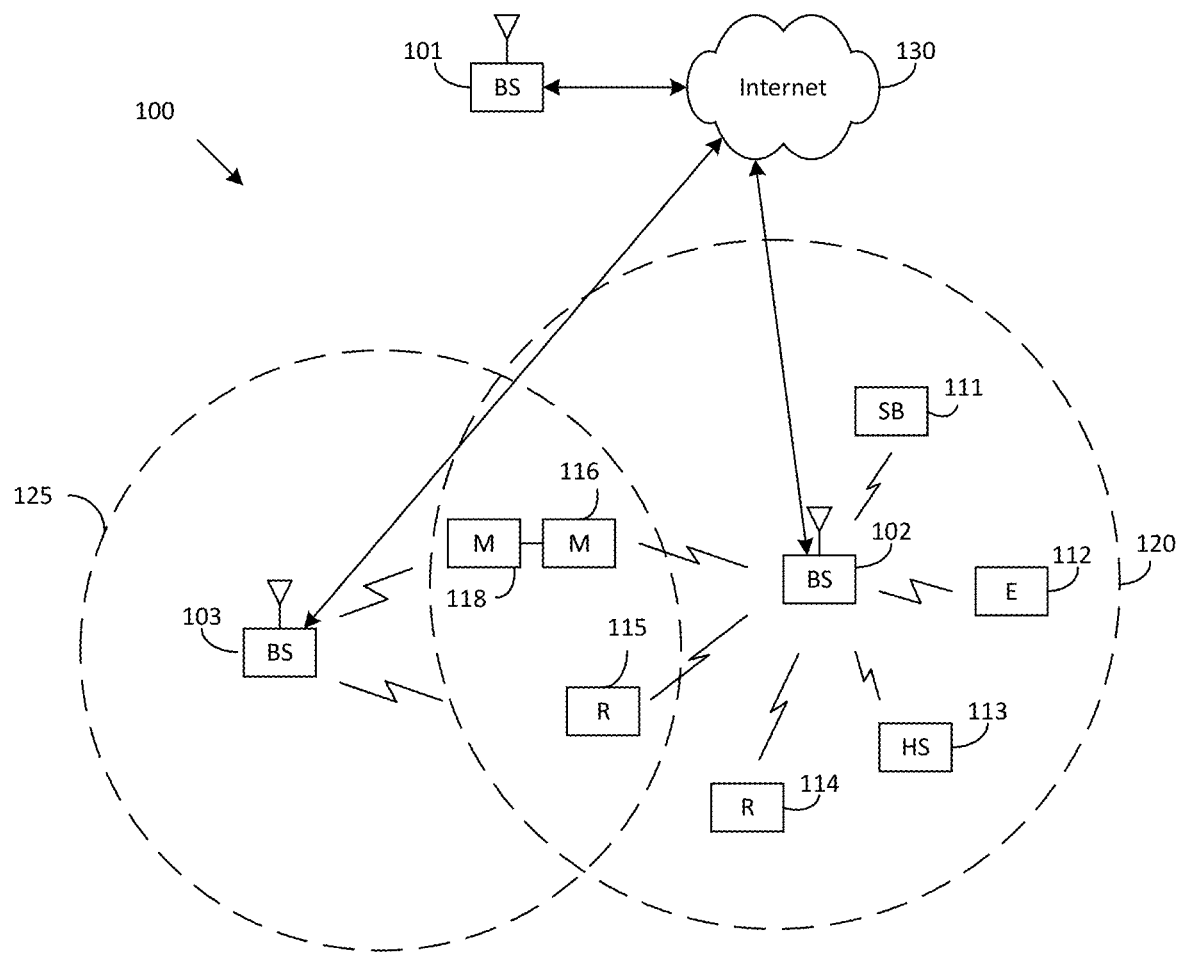
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

In various embodiments, UE 116 can communicate directly with another UE 118 such that UE 116 can act as a gNB for UE 118 as discussed in greater detail below. For example, in some embodiments, the UE 116 and/or UE 118 may be a vehicle and may conduct V2X communications as discussed in greater detail below.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2:
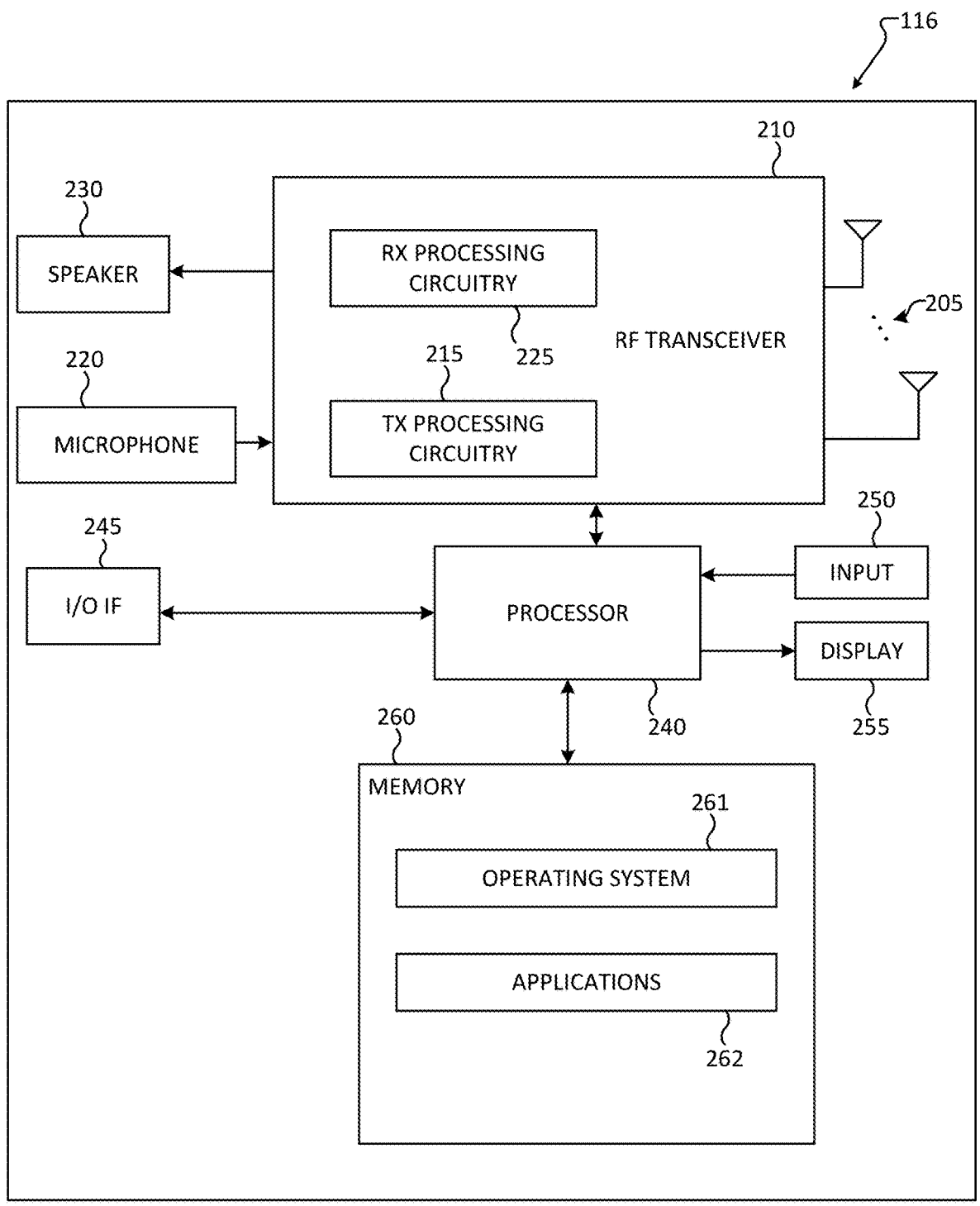
FIG. 2 illustrates an example user equipment according to various embodiments of the present disclosure.

FIG. 2 illustrates an example UE 116 according to the present disclosure. The embodiment of the UE 116 illustrated in FIG. 2 is for illustration only, and the UEs 111-118 of FIG. 1 can have the same or similar configuration. However, UEs come in a wide variety of configurations, and FIG. 2 does not limit the scope of the present disclosure to any particular implementation of a UE.

The UE 116 includes one or more transceivers 210, a microphone 220, a speaker 230, a processor 240, an input/output (I/O) interface 245, an input 250, a display 255, and a memory 260. The memory 260 includes an operating system (OS) program 261 and one or more applications 262.

The transceiver 210 includes transmit (TX) processing circuitry 215 to modulate signals, receive (RX) processing circuitry 225 to demodulate signals, and an antenna array 205 including antennas to send and receive signals. The antenna array 205 receives an incoming signal transmitted by a gNB of the wireless network 100 of FIG. 1. The transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna array 205.

The processor 240 can include one or more processors or other processing devices and execute the OS program 261 stored in the memory 260 in order to control the overall operation of the UE 116. For example, the processor 240 can control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 can execute other processes and programs resident in the memory 260, such as operations for non-zero power or zero power channel state information reference signal (CSI-RS) reception and measurement for systems. The processor 240 can move data into or out of the memory 260 as part of an executing process. In some embodiments, the processor 240 is configured to execute the applications 262 based on the OS program 261 or in response to signals received from gNBs or an operator. The processor 240 is also coupled to the I/O interface 245, which provides the UE 116 with the ability to connect to other devices such as laptop computers and handheld computers. The I/O interface 245 is the communication path between these accessories and the processor 240.

The processor 240 is also coupled to the input 250 (e.g., keypad, touchscreen, button etc.) and the display 255. The operator of the UE 116 can use the input 250 to enter data into the UE 116. The display 255 can be a liquid crystal display or other display capable of rendering text and/or at least limited graphics, such as from web sites.

The memory 260 is coupled to the processor 240. The memory 260 can include at least one of a random-access memory (RAM), Flash memory, or other read-only memory (ROM).

Although FIG. 2 illustrates one example of UE 116, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs) and one or more graphics processing units (GPUs). Although FIG. 2 illustrates the UE 116 as a mobile telephone or smartphone, UEs can be configured to operate as other types of mobile or stationary devices.

Figure 3:
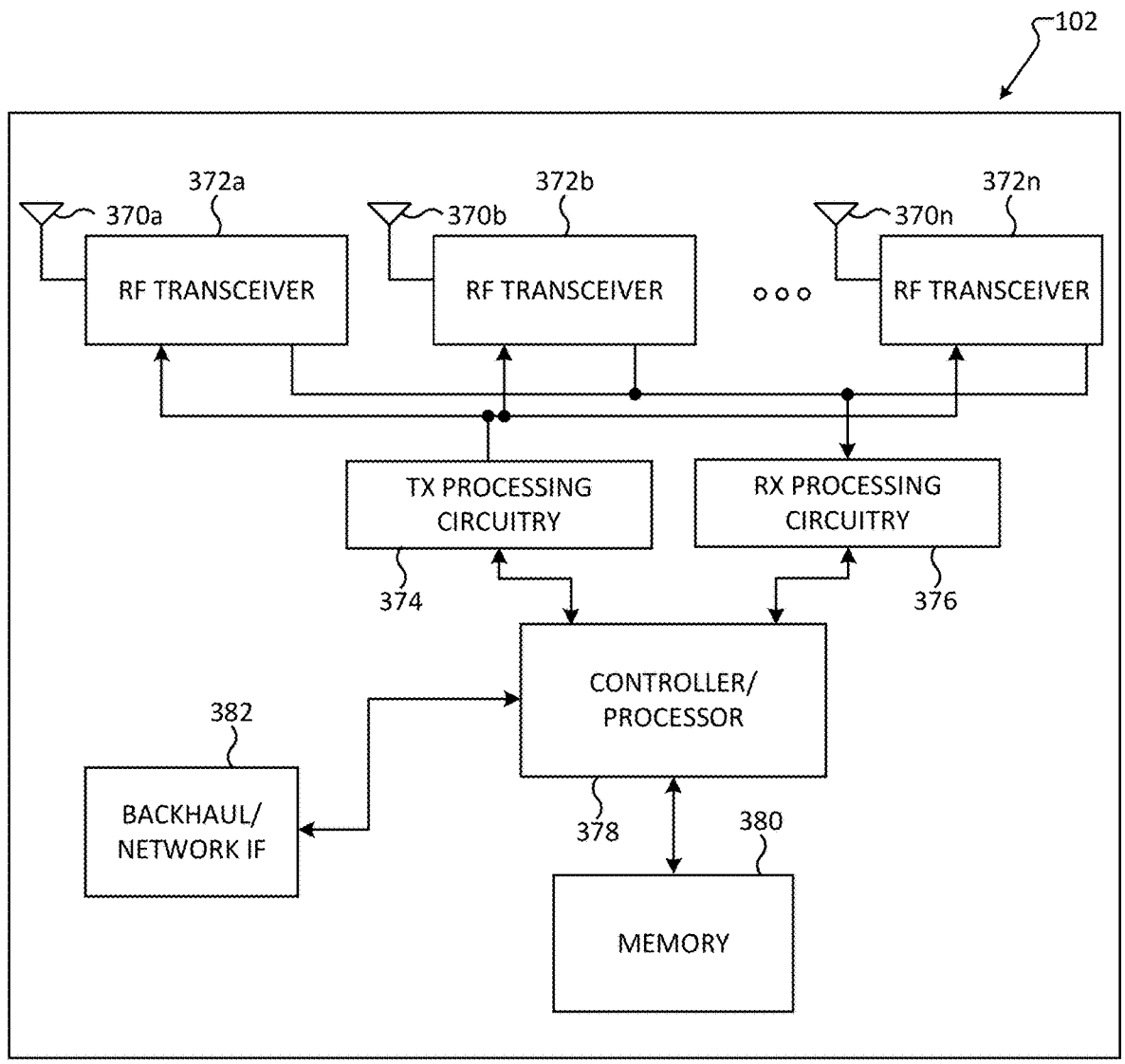
FIG. 3 illustrates an example BS according to various embodiments of the present disclosure.

FIG. 3 illustrates an example gNB 102 according to the present disclosure. The embodiment of the gNB 102 shown in FIG. 3 is for illustration only, and other gNBs of FIG. 1 can have the same or similar configuration. However, gNBs come in a wide variety of configurations, and FIG. 3 does not limit the scope of the present disclosure to any particular implementation of a gNB. The gNB 101 and the gNB 103 can include the same or similar structure as the gNB 102.

As shown in FIG. 3, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions is stored in memory.

Although FIG. 3 illustrates one example of a gNB 102, various changes can be made to FIG. 3. For example, the gNB 102 can include any number of each component shown in FIG. 3. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

The present disclosure relates generally to wireless communication systems and, more specifically, to vehicular communication network protocols, including vehicle-to-device, vehicle-to-vehicle, and vehicle-to-network communication resource allocation and synchronization methods. A communication system includes a downlink (DL) that conveys signals from transmission points such as base stations (BSs or gNBs) to user equipments (UEs) and an uplink (UL) that conveys signals from UEs to reception points such as gNBs. Additionally, a communication system can include a sidelink (SL) to support transmissions and receptions among UEs or among other non-infrastructure-based nodes.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 milliseconds and include 14 symbols, and a RB can have a BW of 180 kHz or 360 kHz and include 12 SCs with inter-SC spacing of 15 kHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TB s) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

Figure 4A:
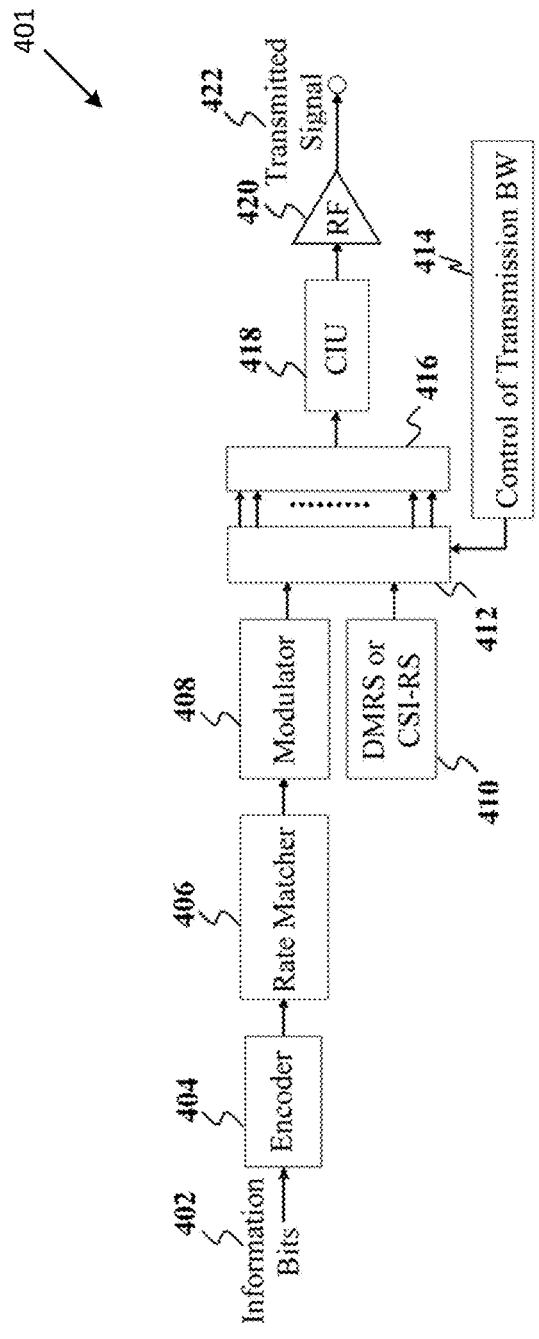
FIG. 4A illustrates an example transmitter structure according to various embodiments of the present disclosure.

FIG. 4A illustrates an example transmitter structure 401 using OFDM according to embodiments of the present disclosure. An embodiment of the transmitter structure 401 shown in FIG. 4A is for illustration only. One or more of the components illustrated in FIG. 4A can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 402, are encoded by encoder 404, rate matched to assigned time/frequency resources by rate matcher 406 and modulated by modulator 408. Subsequently, modulated encoded symbols and DMRS or CSI-RS 410 are mapped to SCs 412 by SC mapping unit 414, an inverse fast Fourier transform (IFFT) is performed by filter 416, a cyclic prefix (CP) is added by a CP insertion unit (CIU) 418, and a resulting signal 422 is filtered by a filter and transmitted by an radio frequency (RF) unit 420.

Figure 4B:
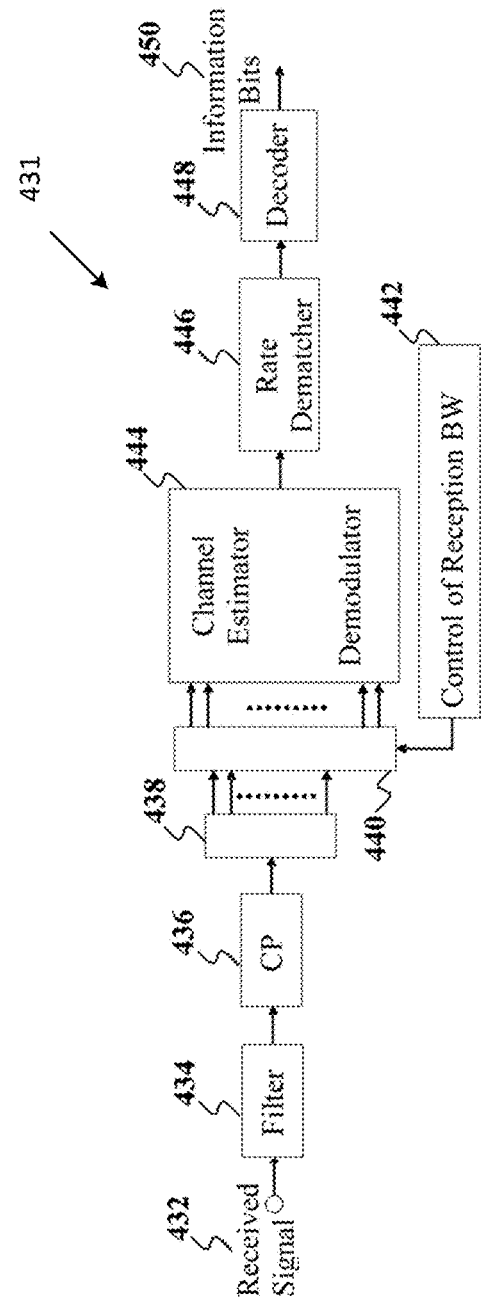
FIG. 4B illustrates an example receiver structure according to various embodiments of the present disclosure.

FIG. 4B illustrates an example receiver structure 431 using OFDM according to embodiments of the present disclosure. An embodiment of the receiver structure 431 shown in FIG. 4B is for illustration only. One or more of the components illustrated in FIG. 4B can be implemented in specialized circuitry configured to perform the noted functions or one or more of the components can be implemented by one or more processors executing instructions to perform the noted functions. Other embodiments are used without departing from the scope of the present disclosure.

A received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

Figure 4C:
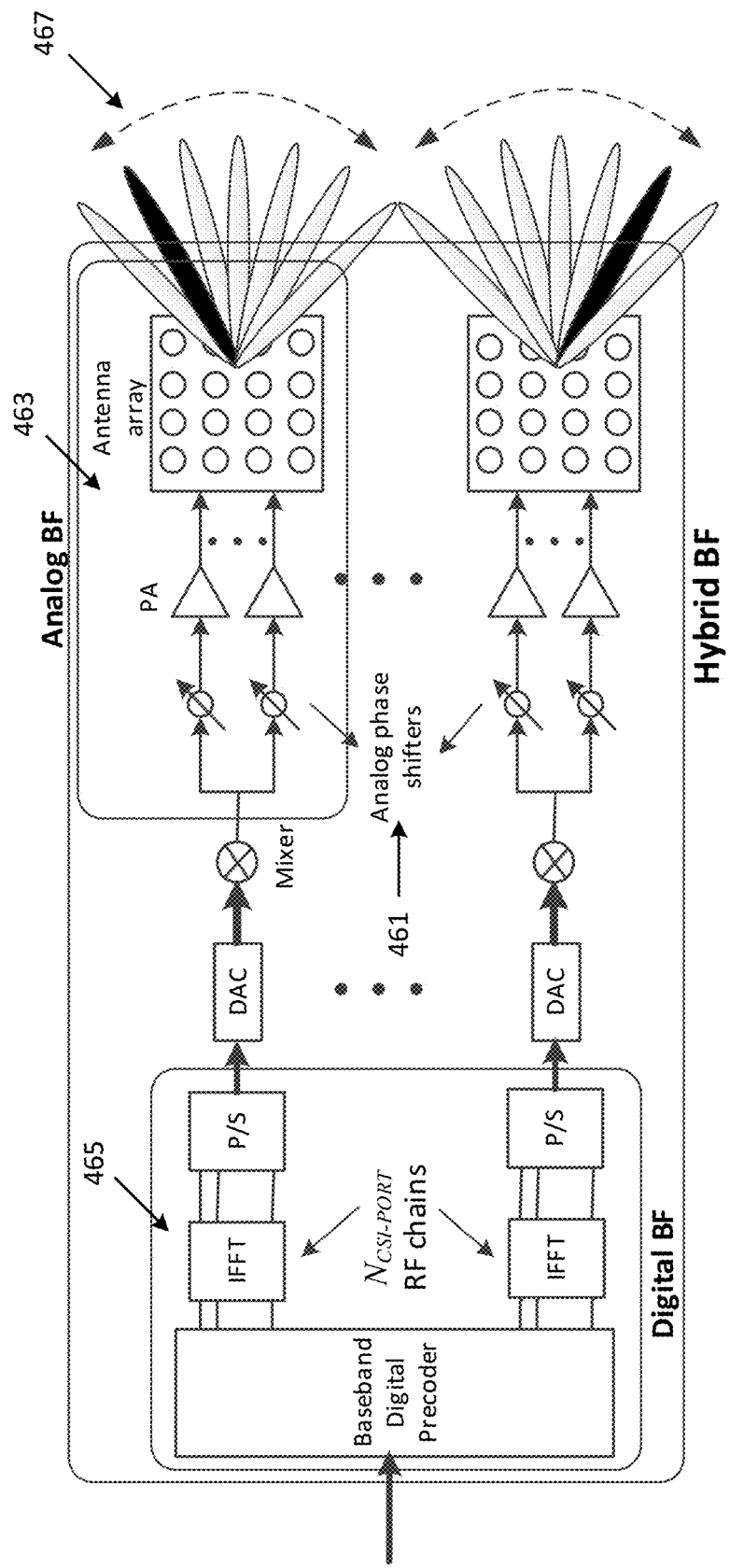
FIG. 4C illustrates an example for a mapping of a CSI-RS port to antenna elements according to various embodiments of the present disclosure.

FIG. 4C illustrates an example for a mapping of a CSI-RS port to antenna elements according to various embodiments of the present disclosure. In various embodiments, the transmitter structure 401 and receiver structure 431 can be implemented as the antenna elements in FIG. 4C. In various embodiments, the transmitter structure 401 and receiver structure 431 can be implemented in FIGS. 2 and 3.

One CSI-RS port is mapped onto a number of antenna elements that can be substantially larger than one and can be controlled by a bank of analog phase shifters 461. One CSI-RS port can then correspond to one sub-array that produces a narrow analog beam through analog beamforming 463. The analog beam can be configured to sweep across a wider range of angles 467 by varying the phase shifter bank across symbols or slots. A number of sub-arrays (equal to the number of RF chains) is same as a number of CSI-RS antenna ports $N_{CSI\text{-}PORT}$. A digital beamforming unit 465 performs a linear combination across $N_{CSI\text{-}PORT}$ analog beams to increase precoding gain. While analog beams are wideband (hence not frequency-selective), digital precoding can be varied across frequency sub-bands or resource blocks. For mmWave bands, although a number of antenna elements can be larger for a given form factor, a number of CSI-RS antenna ports, that can correspond to the number of digitally precoded antenna ports, it typically limited due to hardware constraints, such as a feasibility to install a large number of ADCs/DACs at mmWave frequencies.

Traditionally, cellular communication networks have been designed to establish wireless communication links between UEs and fixed communication infrastructure components, such as gNBs, that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles, or with infrastructure, or with other UEs. Such a network is referred to as a V2X network. Multiple types of communication links can be supported by nodes in a V2X network. The communication links can utilize same or different protocols and systems.

Direct communication between vehicles in V2V is based on a sidelink (SL) interface. Sidelink is the UE to UE interface for SL communication and SL discovery. The SL corresponds to the PC5 interface. SL communication is defined as a functionality enabling proximity services (ProSe) Direct Communication between two or more nearby UEs without traversing any network node.

UEs that are in proximity of each other can exchange V2V-related information when permission, authorization, and proximity criteria are fulfilled. The proximity criteria can be configured by the mobile network operator (MNO). UEs supporting V2V Service can also exchange such information when served by or not served by a MNO that supports V2X service. The UE supporting V2V applications transmits application layer information, such as about a location, dynamics, and attributes, as part of the V2V service. The V2V payload can be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X service, such as RSU, application server, and so on.

Figure 5:
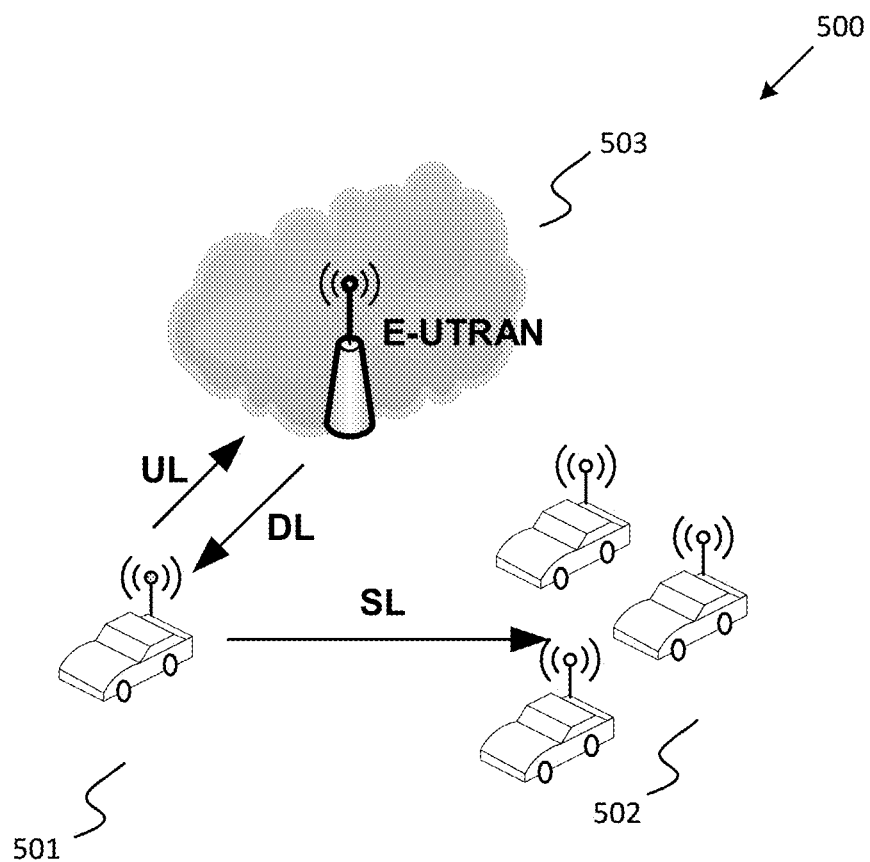
FIG. 5 illustrates an example SL interface according to various embodiments of the present disclosure.

FIG. 5 illustrates an example SL interface 500 according to illustrative embodiments of the present disclosure. For example, the SL interface 500 may be implemented among UEs in a wireless network, for example, as illustrated in FIG. 1. The embodiment of the SL interface 500 shown in FIG. 5 is for illustration only. Other embodiments of the SL interface 500 can be used without departing from the scope of the present disclosure.

In this illustrative embodiment, UL designates the link from UE 501 to gNB 503, DL designates the link from gNB 503 to UE 501, and SL designates the radio links over the PC5 interfaces between UE 501 and UEs 502. UE 501 transmits a V2V message to one or multiple UEs 502 in the SL. The PC5 interface re-uses existing frequency allocation, regardless of the duplex mode (frequency division duplex (FDD) or time division duplex (TDD). To minimize a hardware complexity on a UE and especially on the power amplifier of the UE, transmission on V2V links can occur in the UL band in case of FDD. Similar, the PC5 interface can use time resources (symbols of slots) that are reserved for UL transmission in TDD. The signal transmission can be based on single carrier frequency division multiple access (SC-FDMA) or on orthogonal frequency division multiple access (OFDMA).

A sidelink can include transmissions of signals and channels as for a downlink or for an uplink. For example, similar to a downlink, a sidelink includes transmission of a physical sidelink control channel (PSCCH) providing a sidelink control information (SCI) format scheduling a reception of a physical sidelink shared channel (PSSCH) providing TB(s) for data information and also includes transmission of corresponding DM-RS or of CSI-RS. For example, similar to uplink, a sidelink includes a physical sidelink feedback channel (PSFCH) providing HARQ-ACK information in response to a decoding outcome of a TB in a PSSCH reception.

For a PSSCH transmission from a first UE to a second UE, the second UE can report in a PSFCH HARQ-ACK information for a decoding outcome of TB provided by the PSSCH reception. The HARQ-ACK information has an ACK value when the second UE correctly decodes the TB and a NACK value when the second UE does not correctly decode the TB. The first UE can report the HARQ-ACK information from the second UE to a serving gNB through the uplink.

In several scenarios, such as for example when a HARQ-ACK information reception reliability cannot be ensured or when HARQ-ACK information may not be useful as there may not be retransmissions of a TB, it can be beneficial to dynamically disable reporting of HARQ-ACK information by a UE.

A first UE can transmit a PSSCH providing a TB to a second UE. The TB can include one or more code block groups (CBGs) where each code block (CB) includes a CRC. The second UE can report whether or not each CBG included in the TB is correctly decoded. A CBG is correctly decoded when all CBs included in the CBG are correctly decoded; otherwise, the CBG is incorrectly decoded. For a retransmission of the TB in a PSSCH, the first UE can include only CBGs with NACK value for HARQ-ACK information corresponding to a previous transmission of the TB.

Figure 6:
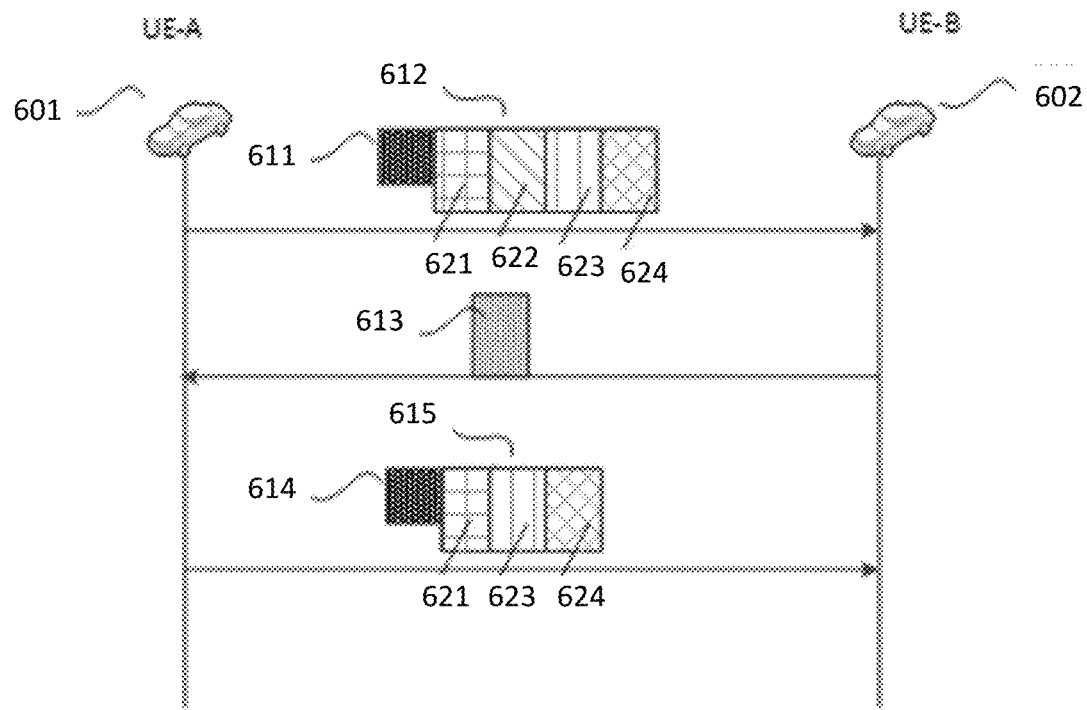
FIG. 6 illustrates a first example of codebook group (CBG)-based HARQ-ACK information reporting on sidelink according to various embodiments of the present disclosure.

FIG. 6 illustrates a first example of CBG-based HARQ-ACK information reporting on sidelink according to various embodiments of the present disclosure. For example, the CBG-based HARQ-ACK information reporting may be among the UEs in a sidelink as illustrated, for example, in FIG. 5. The embodiment of the CBG-based HARQ-ACK information reporting shown in FIG. 6 is for illustration only. Other embodiments can be used without departing from the scope of the present disclosure.

UE-A transmits PSSCH to UE-B. A PSSCH transmission provides a TB and, with CBG-based HARQ-ACK information reporting from UE-B, PSSCH retransmissions provide CBGs (when some CBGs are indicated by the HARQ-ACK information to have been incorrectly decoded by UE-B). UE-A 601 can transmit a PSCCH with a SCI format 611 to schedule a PSSCH reception by UE-B 602. A TB in the PSSCH reception 612 includes four CBGs: 621, 622, 623 and 624. After detecting the SCI format 611, UE-B 602 can decode CBs in a corresponding PSSCH reception 612 according to a configuration provided by the SCI format 611. UE-B 602 decodes CBs of each CBG in the TB included in the PSSCH reception 612 and checks a corresponding CBG 621, 622, 623 and 624. UE-B reports HARQ-ACK information of a decoding outcome for each CBG 621, 622, 623 and 624 in a PSFCH 613. In 613, the UE-B can report which ones of CBGs 621, 622, 623 and 624 are decoded correctly. UE-A 601 can re-transmit CBGs that UE-A detects a corresponding HARQ-ACK information to have a NACK value. UE-A can indicate in a SCI format 614 scheduling a retransmission of TB in a PSSCH 615 that three of the four CBGs 621, 623 and 624 are re-transmitted.

SL transmission and reception by a UE occur within resources assigned to one or more UEs in a group of UEs. A resource pool (RP) is a set of resources assigned for sidelink operation and consists of slots in the time domain and resource blocks in the frequency domain.

Figure 7:
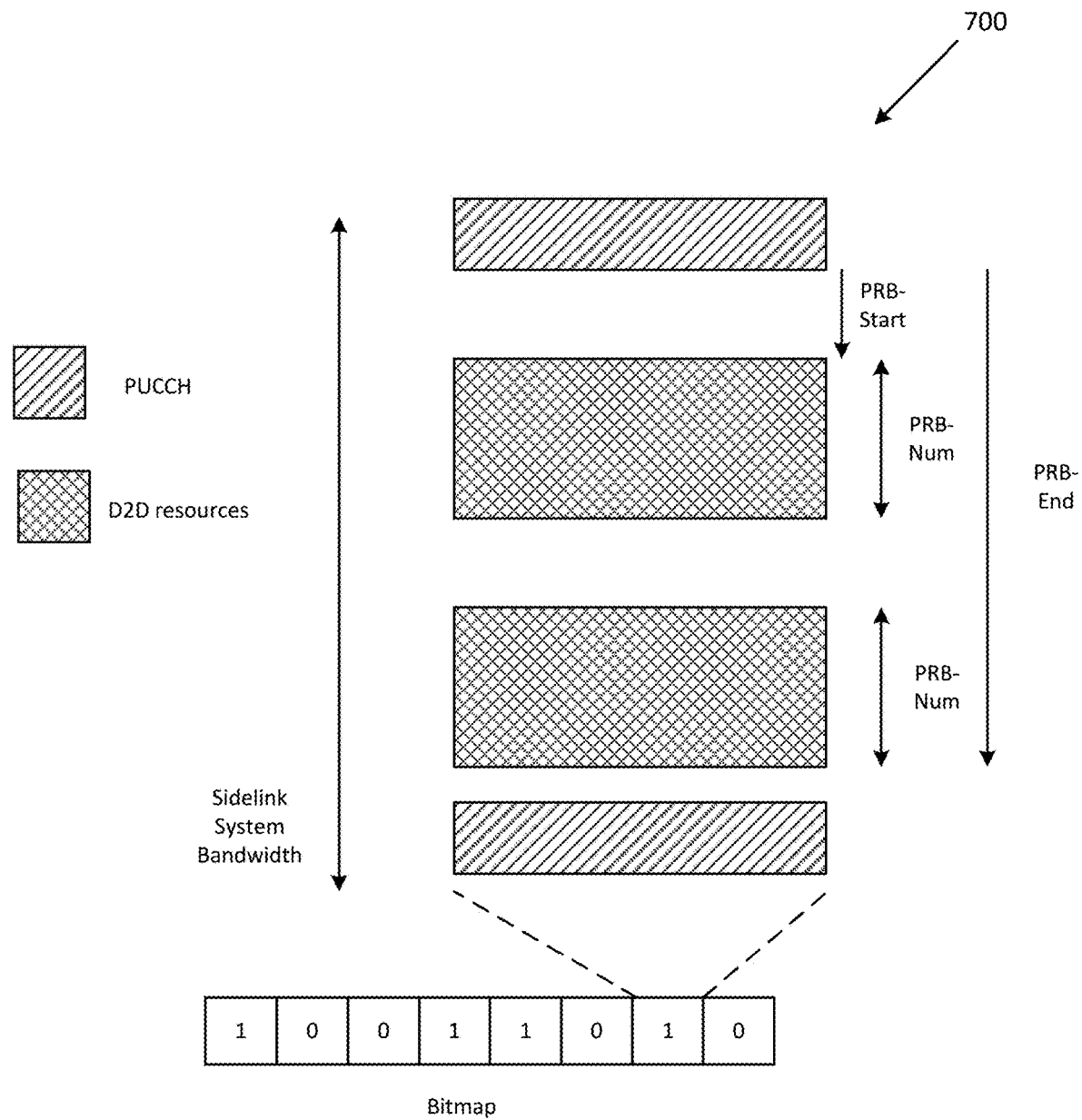
FIG. 7 illustrates an example resource pool according to various embodiments of the present disclosure.

FIG. 7 illustrates an example resource pool 700 according to various embodiments of the present disclosure. For example, the resource pool 700 may be shared among the UEs in a sidelink as illustrated, for example, in FIG. 5. The embodiment of the resource pool shown in FIG. 7 is for illustration only. Other embodiments can be used without departing from the scope of the present disclosure.

A resource pool 700 is defined as follows:
(a) in the frequency domain, by parameters
PRBnum: defining a frequency range/bandwidth in a number of physical RBs (PRB)
PRB start, PRBend: defining a location in frequency for the number of PRBs
(b) in the time domain, by a bitmap that indicates slots available for SL transmissions A pool of time-frequency resources is repeated with a period defined by a parameter SC-Period, for example in a number of slots or in a number of milliseconds with range of possible values between 40 msec and 320 msec where, for example, the smaller values can be used for voice traffic.

UEs can scan a resource pool to receive PSCCH and detect a SCI format that includes a group identifier for the UEs. A UE transmits a PSCCH with a SCI format within the resource pool.

Resource pools can be of two types: reception resource pools (Rx RPs) and transmission resource pools (Tx RPs). Within a cell, there may be more Rx RPs than Tx RPs to enable reception from adjacent cells or from out-of-coverage UEs.

Two modes of resource allocation exist for V2X communications: Mode 1 that is also referred to as "scheduled resource allocation" and Mode 2 that is also referred as "UE autonomous resource selection". In Mode 1, transmissions on sidelink are scheduled by a gNB. The UE detects a DCI format from the gNB that indicates resources for PSCCH/PSSCH transmission and then the UE transmits a PSCCH with a SCI format scheduling a PSSCH transmission over resources indicated by the DCI format.

Figure 8:
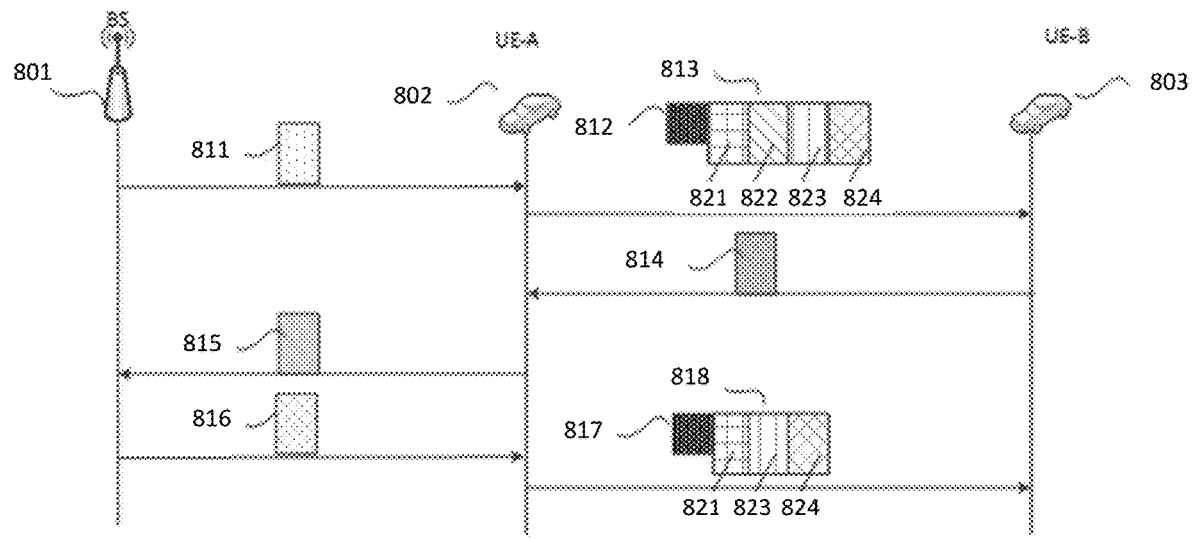
FIG. 8 illustrates a second example of CBG-based HARQ-ACK information reporting on sidelink according to various embodiments of the present disclosure.

FIG. 8 illustrates a second example of CBG-based HARQ-ACK information reporting on sidelink according to various embodiments of the present disclosure. For example, the CBG-based HARQ-ACK information reporting may be among the UEs in a sidelink as illustrated, for example, in FIG. 5. The embodiment of the CBG-based HARQ-ACK information reporting on sidelink shown in FIG. 8 is for illustration only. Other embodiments can be used without departing from the scope of the present disclosure.

UE-A 802 transmits a PSSCH to UE-B 803 through sidelink. A sidelink resource used for the PSSCH transmission is allocated to UE-A by a serving gNB, or BS, 801. The BS 801 can transmit a PDCCH to UE-A 802 to allocate, through a corresponding DCI format, to UE-A 802 the sidelink resource for PSCCH and PSSCH transmissions. UE-A transmits a PSCCH and a PSSCH in the allocated sidelink resource. A TB included in a PSSCH reception 813 by UE-B comprises of four CBGs 821, 822, 823 and 824.

UE-B 803 detects a SCI format 812 in a PSCCH reception and then decodes the TB in a PSSCH reception 813 according to configuration information provided by the SCI format 812. UE-B decodes each CB for CBGs 821, 822, 823 and 824 and then checks a corresponding CRC. UE-B 803 reports HARQ-ACK information for each of the four CBGs in the PSSCH reception 813 through a PSFCH 814. UE-A can report the detected HARQ-ACK information for the four CBGs 821, 822, 823 and 824 to the serving gNB 801 in a PUCCH or PUSCH transmission 815. The following alternatives can apply for the HARQ-ACK information reports by UE-A in 815:
UE-A can report a number of incorrectly decoded CBGs among the four CBGs 821, 822, 823 and 824.
UE-A can report the incorrectly decoded CBGs among the four CBGs 821, 822, 823 and 824.
UE-A can report the correctly decoded CBGs among the four CBGs 821, 822, 823 and 824.
UE-A can report HARQ-ACK information for each of the four CBGs 821, 822, 823 and 824.

After a reception of a HARQ-ACK information report from UE-A 802, the gNB 801 can transmit a PDCCH 816 to UE-A to allocate, through a DCI format in the PDCCH, a sidelink resource for UE-A 802 to retransmit incorrectly decoded CBGs by UE-B. UE-A 802 can transmit a PSCCH with a SCI format 817 scheduling a PSSCH reception 818 to UE-B that includes the incorrectly decoded CB Gs 821, 823 and 824 using the sidelink resource allocated by the gNB 801. In the SCI format 817, UE-A can indicate the CBGs, from the four CBGs 821, 822, 823 and 824, that are included in the PSSCH reception 818.

A UE can transmit a PSCCH providing a SCI format that schedules one or more PSSCH receptions to one or more other UEs. The SCI format can include one or more of the following information elements (fields):
A destination ID to identify a UE or a group of UEs for a corresponding PSSCH reception;
A HARQ process number;
A source ID to identify a UE transmitting the PSCCH/PSSCH;
A new data indicator (NDI) to indicate whether the PSSCH includes a first transmission or a retransmission of a TB;
A redundancy version (RV);
CBG transmission indicator to indicate initial transmission or retransmission of a CBG in the PSSCH;
A SL_HARQ_Conf field to indicate whether reporting of HARQ-ACK information for the TB/CB Gs of the scheduled PSSCH reception is enabled or disabled;
A resource allocation field for a PSFCH transmission with HARQ-ACK information from a UE receiving the PSSCH.

In V2X communications, subchannels can be defined as a group of resource blocks (RBs) over a time unit such as a slot or a subframe. A number of RBs per subchannel can vary or can be same. Subchannels are used to transmit data and control information.

A first sub-channelization scheme corresponds to adjacent PSCCH and PSSCH transmission in frequency. A PSCCH with a SCI format and a PSSCH with a TB are transmitted in adjacent RBs. For example, for each SCI format+TB transmission, the PSCCH/SCI format is transmitted in the first two RBs of a first subchannel and the PSSCH/TB is transmitted in RBs following the RBs for the PSCCH/SCI format and over several subchannels.

A second sub-channelization scheme corresponds to non-adjacent PSCCH and PSSCH transmissions in frequency.

The RBs are divided into pools. One pool is used only for a PSCCH transmission with a SCI format and the PSCCH transmission can occupy two RBs. The second pool is used only for a PSSCH transmission with a TB and is divided into subchannels.

A physical sidelink feedback channel (PSFCH) is used to provide sidelink feedback control information (SFCI), such as HARQ-ACK information, for unicast or groupcast PSSCH receptions. SFCI may also be used in a sensing procedure. A resource (re)-selection procedure can use results of a sensing procedure to determine resource(s) for sidelink transmission.

At least two sidelink resource allocation modes are defined for sidelink communication. In mode 1, a base station (gNB) indicates to a UE sidelink resource(s) for sidelink transmission(s). In mode 2, a UE determines sidelink transmission resource(s), within sidelink resources that are configured by a base station to the UE or are pre-configured to the UE.

An initial transmission of a TB in a PSSCH can be based on a sensing and resource selection procedure without prior resource reservation. A sidelink resource for an initial transmission of a TB in a PSSCH can be reserved, at least by an SCI format in a PSCCH that schedules a different TB, based on a sensing and resource selection procedure. This operation can be enabled/disabled by pre-configuration.

When HARQ-ACK information reporting in enabled for a groupcast PSSCH transmission, in a first option a UE transmits only HARQ-ACK information with NACK value while in a second option the UE transmits HARQ-ACK information with either ACK or NACK value. When a set of UEs transmit only HARQ-ACK information with NACK value, a PSFCH resource can be common to all UEs or to subsets of the set of UEs. When UEs transmit HARQ-ACK information with either ACK or NACK value, a first UE uses a separate/different resource for a PSFCH transmission with the HARQ-ACK information than a second UE. It is also possible that, for groupcast PSSCH transmissions, all UEs in the set of UEs or a subset of UEs share a first PSFCH resource for HARQ-ACK information with ACK value and a second PSFCH resource for HARQ-ACK information with NACK value. Each PSFCH resource is mapped to a time, frequency, and code resource.

In a resource pool, within the slots associated with the resource pool, PSFCH resources can be (pre)configured periodically with a period of N slot(s). N is configurable and, for example, N can have a value of 1 slot or a value larger than 1 slot. The configuration can also include the possibility of no resource for PSFCH transmission, such as for example no time resources when a periodicity is configured to be 0 slots, or not frequency resources when a number of RBs is configured to be 0. Accordingly, HARQ-ACK information reporting for PSSCH transmissions/receptions in the resource pool can be disabled. In addition, a UE may transmit PSFCH providing HARQ-ACK information for PSSCH transmissions/receptions in a resource pool only in the resource pool.

Various embodiments of the present disclosure enable symbol-based resource sensing, slot-based resource sensing, resource reservation, and an adaptation of counter for sensing symbols and sensing slots.

For example, for symbol-based resource sensing, some or all of the following parameters can be configured to a UE for each access class: number of symbols N that a UE senses in a slot, the minimum and maximum number of symbols N, $N_{min}$ and $N_{max}$, the number of slots that a UE may occupy the channel, the number of back-off slots B when a UE detects the channel to be busy, and the minimum and maximum numbers of back-off slots $B_{min}$ and $B_{max}$. For slot-based resource sensing, some or all of the following parameters can be configured to a UE for each access class: number of slots N that a UE senses in a slot, the minimum and maximum number of slots N, $N_{min}$ and $N_{max}$, and the number of slots that a UE can occupy the channel. For resource reservations for multi-slot periodic resource, a periodic multi-slot resource can be reserved by a single SCI format. For resource reservations for multi-slot aperiodic resource, a one-time multi-slot resource can be reserved by a single SCI format for either initial transmission or retransmission of a TB in a PSSCH. The retransmission can be either based on reported HARQ-ACK information or can be a blind retransmission prior to or without reported HARQ-ACK information.

For resource reservations for both periodic and aperiodic resources, a resource is reserved for both one-time type resource and periodic resource in one SCI format. For the adaptation of a counter for sensing symbols and sensing slots, the counter for sensing symbols or slots for a UE can be adapted based upon received HARQ-ACK information for each groupcast or unicast PSSCH, received HARQ-ACK information from each UE transmitting PSSCH, received HARQ-ACK information for each subchannel with PSSCH transmissions/receptions, or received HARQ-ACK information in each group of subchannels.

Various embodiments of the present disclosure provide methods to convey a preemption indication. For example, a PSCCH transmission or a PSSCH transmission can be used to convey preemption information. In some embodiments, the information is provided by a PSSCH without SL-SCH data, or by a PSSCH as part of SL-SCH data or separately from SL-SCH data, such for example in a MAC control element.

Various embodiments of the present disclosure provide methods to convey resource reservation information. For example, PSCCH transmissions or PSSCH transmissions can be used to convey resource reservation information. In some embodiments, the information is provided by a PSSCH without SL-SCH data, or by a PSSCH as part of SL-SCH data, or separately from SL-SCH data, such for example in a MAC control element.

For resource sensing, a UE, such as the UE 116, selects all or some of the candidate resources at one slot and then performs sensing on each selected candidate time-frequency resource. If the sensing succeeds and the time-frequency resource is available, the UE 116 can use that resource to transmit. If the sensing fails, the UE 116 can wait to resume resource sensing on available candidate resources in following slots or after a number of back-off slots. The UE 116 can be configured with one or more of the following for resource sensing: a number of symbols N that the UE 116 senses in a slot for channel access, a minimum and a maximum number of symbols N, $N_{min}$ and $N_{max}$, a number of symbols N used to determine a number of symbols for the UE 116 to perform sensing, a number of slots that the UE 116 occupies the channel, a number of back-off slots B when the UE 116 detects the channel to be busy, and a minimum and maximum number of back-off slots $B_{min}$ and $B_{max}$, when the UE 116 detects the channel busy.

In some embodiments, the UE 116 can be provided configurations that include one or more parameters from Table 1.

TABLE 1

| Access Class | $N_{min}$ | $N_{max}$ | the number of back-off slots B | Number of maximum channel occupancy slots |
|---|---|---|---|---|
| 0 | x | x | x | x |
| 1 | x | x | x | x |
| ... | ... | ... | ... | ... |
| n | x | x | x | x |

As shown in Table 1, there is a minimum and a maximum number of symbols, $N_{min}$ and $N_{max}$, where each N is selected from [$N_{min}$, $N_{max}$] as configured in each access class with allowed values. As an example, the UE 116 can be configured according to Table 2, which is an example realization of Table 1.

TABLE 2

| Access Class | $N_{min}$ | $N_{max}$ | the number of back-off slots | Number of maximum channel occupancy slots |
|---|---|---|---|---|
| 0 | 0 | 0 | 0 | 1 |
| 1 | 1 | 3 | 0 | 3 |
| 2 | 4 | 9 | 1 | 8 |
| 3 | 10 | 14 | 3 | 10 |

As shown in Table 2, the UE 116 with access class 0 has the highest priority where sensing is not required to be performed. However, the UE 116 does not occupy more than one slot for transmissions. For UEs with other access classes, a number of symbols N, a number of back-off slots, and a number of maximum channel occupancy slots can increase according to an increase in a corresponding access class number.

In another embodiment, the UE 116 can be configured according to Table 3. When the UE 116 is configured according to Table 3, the UE 116 does not apply any back-off slots for sensing. When the UE 116 performs sensing in one slot and determines that the resource in the slot is not available, the UE 116 performs sensing in available candidate resources in the next slot. Accordingly, the number of back-off slots is zero for each access class.

TABLE 3

| Access Classes | $N_{min}$ | $N_{max}$ | Number of maximum channel occupancy slots |
|---|---|---|---|
| 0 | x | x | x |
| 1 | x | x | x |
| ... | ... | ... | ... |
| n | x | x | x |

As an example, the UE 116 can be configured according to Table 4, which is an example realization of Table 3.

TABLE 4

| Access Classes | $N_{min}$ | $N_{max}$ | Number of maximum channel occupancy slots |
|---|---|---|---|
| 0 | 0 | 0 | 1 |
| 1 | 1 | 3 | 3 |
| 2 | 4 | 8 | 8 |
| 3 | 9 | 14 | 10 |

In another embodiment, there is only one number of symbols N for each access class as shown in Table 5.

TABLE 5

| Access Classes | N | the number of backoff slots | Number of maximum channel occupancy slots |
|---|---|---|---|
| 0 | x | x | x |
| 1 | x | x | x |
| ... | ... | ... | ... |
| n | x | x | x |

In another embodiment, for each number of back-off slots, there is a minimum and a maximum number $B_{min}$ and $B_{max}$ for each access class as shown in Table 6.

TABLE 6

| Access Classes | N | minimum number of backoff slots | maximum number of backoff slots | Number of maximum channel occupancy slots |
|---|---|---|---|---|
| 0 | x | x | x | x |
| 1 | x | x | x | x |
| ... | ... | ... | ... | ... |
| n | x | x | x | x |

For slot-based resource sensing, the UE 116 senses the channel for a number of N slots to determine whether or not the channel can be used for transmissions. The UE 116 can be configured with one or more of the following: a number of slots N that the UE 116 senses for channel access, a minimum and a maximum number of slots N, $N_{min}$ and $N_{max}$, and a number of slots that the UE 116 can occupy in the channel.

For example, the UE 116 can be provided configurations of parameters according to Table 7.

TABLE 7

| Access Class | $N_{min}$ | $N_{max}$ | Number of maximum channel occupancy slots |
|---|---|---|---|
| 0 | x | x | x |
| 1 | x | x | x |
| ... | ... | ... | ... |
| n | x | x | x |

Table 7 includes a minimum and a maximum number of slots N, $N_{min}$ and $N_{max}$. Each N can be selected from [$N_{min}$, $N_{max}$] that is configured in each access class with allowed values. As an example, the UE 116 can be configured according to Table 8 which is an example realization of Table 7.

TABLE 8

| Access Class | $N_{min}$ | $N_{max}$ | Number of maximum channel occupancy slots |
|---|---|---|---|
| 0 | 0 | 0 | 1 |
| 1 | 1 | 3 | 3 |
| 2 | 4 | 9 | 8 |
| 3 | 10 | 14 | 10 |

When the UE 116 is configured according to Table 8, the UE 116 with access class 0 has the highest priority where sensing is not required to be performed. However, the UE 116 cannot occupy more than one slot for transmissions. For UEs with other access classes, the number of slots N for sensing and the number of maximum channel occupancy slots can increase with the increase in the access class number.

In another embodiment, there is only one number of slots N for each access class as shown in Table 9.

TABLE 9

| Access Classes | N | Number of maximum channel occupancy slots |
|---|---|---|
| 0 | x | x |
| 1 | x | x |
| ... | ... | ... |
| n | x | x |

For resource reservation for multi-slot periodic resources, a resource reservation field indicates a periodicity of reserved resource for transmission of a next transport block. The UE 116 sets the resource reservation field according to Table 10, for a field of 4 bits, based on indicated value X, where X is equal to the resource reservation interval provided by higher layers divided by 100.

TABLE 10

| Resource reservation field in SCI format 1 | Indicated value X | Condition |
|---|---|---|
| '0001', '0010', . . . , '1010' | Decimal equivalent of the field | The higher layer decides to keep the resource for the transmission of the next transport block and the value X meets 1 ≤ X ≤ 10. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

A periodic multi-slot resource can be reserved by a single SCI format. The SCI format can include a resource reservation field that indicates a periodicity for the resource reservation and a field for a number of consecutive slots that indicates a multi-slot resource.

Figure 9:
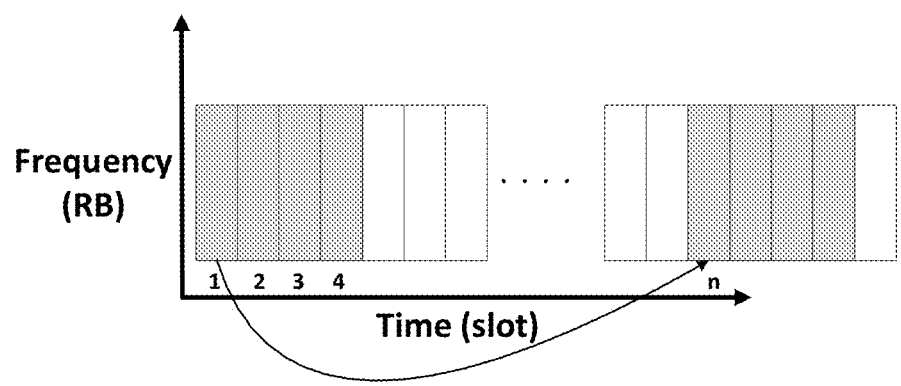
FIG. 9 illustrates an SCI format field including time slots according to various embodiments of the present disclosure.

FIG. 9 illustrates an SCI format field that includes time slots according to various embodiments of the present disclosure. The SCI format field in a slot/indicates four consecutive time slots that are reserved for the periodic resource. Slot 1 can correspond to slot n. The embodiment of the SCI format field in FIG. 9 is for illustration only. Other embodiments can be used without departing from the scope of the present disclosure.

For resource reservation for multi-slot aperiodic resources, a one-time multi-slot resource can be reserved by a single SCI format for either initial transmission or for retransmission of a TB (HARQ-ACK based or blind retransmission). A field of a number of consecutive slots indicates a multi-slot resource for either initial transmission or retransmission.

Figure 10:
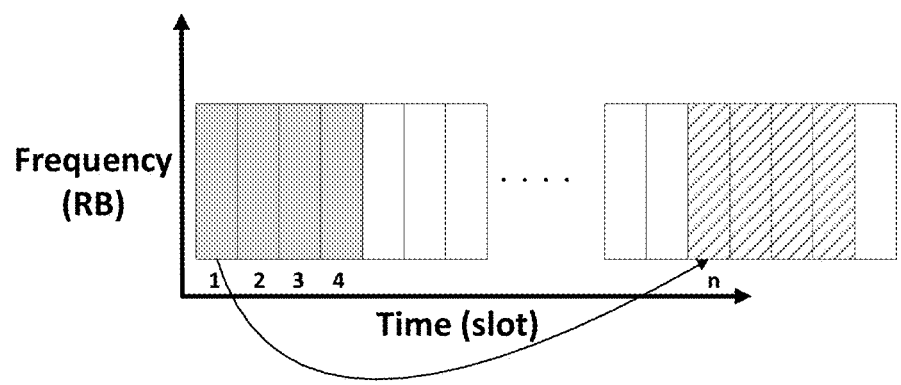
FIG. 10 illustrates an SCI format field including time slots according to various embodiments of the present disclosure.

FIG. 10 illustrates an SCI format field including time slots according to various embodiments of the present disclosure. As shown in FIG. 10, the SCI format field in a slot/indicates four consecutive time slots that are reserved for a retransmission resource starting from slot n, where slot 1 can correspond to slot n. The embodiment of the SCI format field shown in FIG. 10 is for illustration only. Other embodiments can be used without departing from the scope of the present disclosure.

For resource reservations for both periodic and aperiodic resources, the SCI format can indicate both periodic resources and aperiodic resources. Aperiodic resources can be either consecutive or non-consecutive resources in time and be used for a one-time transmission.

In some embodiments, a first field in the SCI format indicates resources in a current slot and in following slots wherein the resources are located in a same frequency and are reserved as a one-time type resource. The first field indicates a number of following slots for the one-time type resource. A second field in the SCI format indicates a periodicity of reserved resources for a PSSCH transmission with a transport block. Both fields exist in the SCI format to respectively indicate both the reservation of periodic resources and the one-time type resources. The field for the reservation of periodic resource can indicate one slot or multi-slots.

Figure 11:
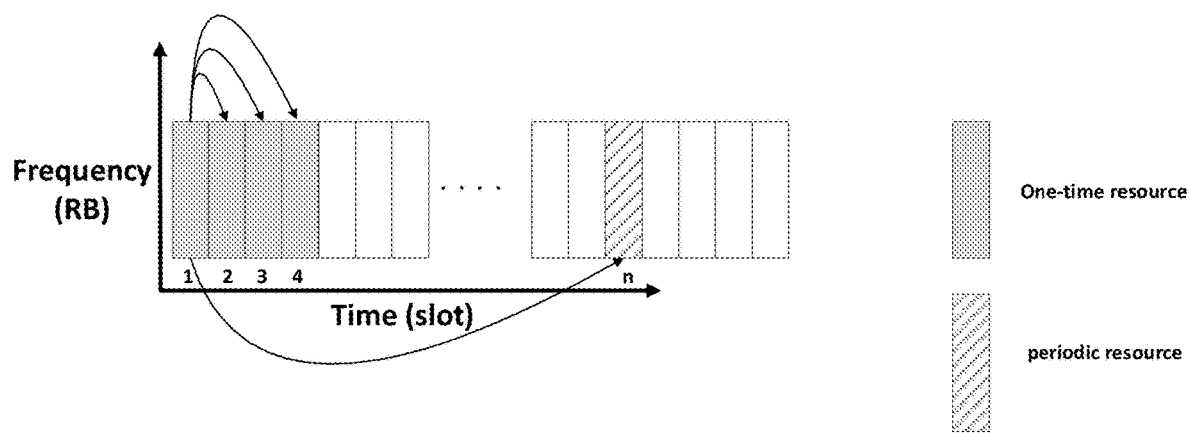
FIG. 11 illustrates an SCI format fields including time slots according to various embodiments of the present disclosure.

FIG. 11 illustrates SCI format fields according to various embodiments of the present disclosure. As shown in FIG. 11, a first SCI format field in slot/indicates that 4 consecutive time slots are reserved for the one-time type resource and a second SCI format field in the slot 1 indicates a periodic resource in slot n. The embodiment of the SCI format fields shown in FIG. 11 is for illustration only. Other embodiments can be used without departing from the scope of the present disclosure.

Figure 12:
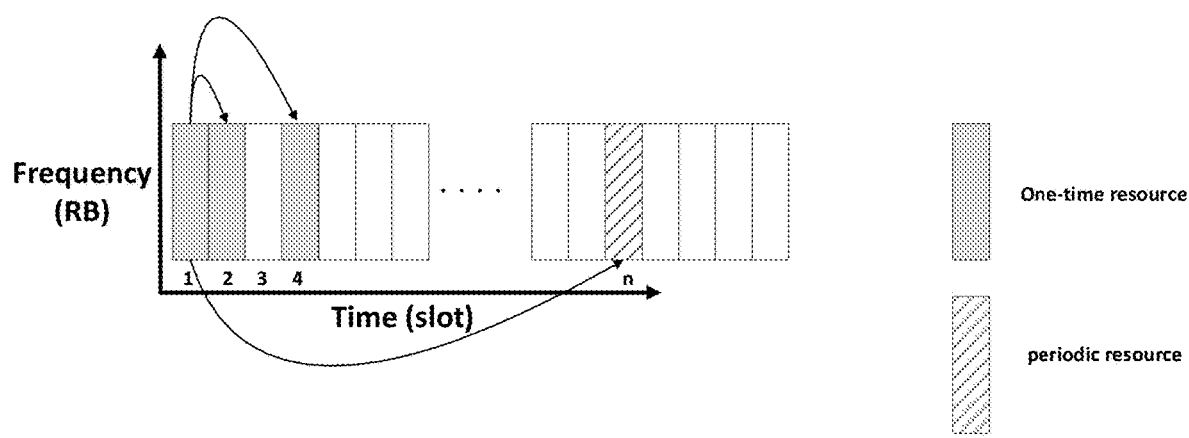
FIG. 12 illustrates an SCI format fields including time slots according to various embodiments of the present disclosure.

As another example, FIG. 12 illustrates SCI format fields according to various embodiments of the present disclosure. As shown in FIG. 12, a first SCI format field in the slot/indicates that 3 time slots are reserved for the one-time type resource. Slot 3 is not reserved because it is reserved by another UE that is sensed, for example, by long-term sensing. A second SCI format field in slot 1 indicates a periodic resource in slot n. The embodiment of the SCI format field shown in FIG. 12 is for illustration only. Other embodiments can be used without departing from the scope of the present disclosure.

For an adaptation of a counter for sensing symbols and sensing slots, a number of symbols N indicates a number of symbols the UE 116 uses to perform sensing. The value of N can be within a range of $N_{min}$ and $N_{max}$. An initial value of N can be $N_{min}$. The adaptation can be based on HARQ-ACK information values. If x percent of HARQ-ACK information values that the UE receives within a slot window [t1, t2] are NACK, the UE increases N for every access class to a next higher allowed value, such as $N=N+N_{step}$ if $N+N_{step}<=N_{max}$, otherwise, $N=N_{max}$.

The UE 116 can use a number of back-off slots B to determine each slot where the UE 116 performs sensing after a sensing failure in a current slot. The number of back-off slots can be within a range of $B_{min}$ and $B_{max}$. An initial value of B can be $B_{min}$. The UE 116 can adapt a value of B based on HARQ-ACK information values the UE 116 receives. If x percent of the HARQ-ACK information values that the UE receives within a slot window [t1, t2] are NACK, then UE 116 increases B for every access class to a next higher allowed value, such as $B=B+B_{step}$ if $B+B_{step}<=B_{max}$, otherwise, $B=B_{max}$. Accordingly, various embodiments enable the determination of the percent of received HARQ-ACK information values.

In some embodiments, the percent of HARQ-ACK information values the UE 116 receives can be calculated based upon each groupcast or unicast PSSCH transmission. For groupcast PSSCH transmissions, HARQ-ACK information values can be for TB s intended for each respective group. A number of k HARQ-ACK information values is counted for k PSFCH receptions from multiple UEs for a same TB transmitted by the UE 116. For unicast PSSCH transmissions, the HARQ-ACK information values can be calculated from a PSFCH reception from each UE receiving a PSSCH transmission.

In some embodiments, there is only one percent value of HARQ-ACK information for transmitter UE 116. The HARQ-ACK information values for groupcast and unicast can be calculated together in determining the percent. For groupcast, k HARQ-ACK information values are counted for k PSFCH receptions from multiple UEs for a same TB transmitted by the UE 116.

In some embodiments, the percent of HARQ-ACK information values is calculated in each subchannel. In some embodiments, the percent of HARQ-ACK information values is calculated in each group of subchannels.

In various embodiments, preemption indication can be used by a UE with higher-priority transmission to pre-empt resources used by a UE with a lower-priority transmission. The preemption indication is transmitted by the UE with higher-priority transmission to inform other UEs of the pre-empted resources. In one embodiment, the preemption indication can be conveyed by a SCI format in a PSCCH that does not schedule a PSSCH transmission, wherein the SCI format indicates a set of time resources and frequency resources for cancellation of transmissions by other UEs. In another embodiment, the preemption indication can be conveyed by a PSSCH transmission scheduled by a SCI format in a PSCCH transmission that may not include SL-SCH data. A field in the SCI format in the PSCCH transmission can indicate whether or not the PSSCH provides preemption information.

In various embodiments, the UE 116 can multiplex preemption indication information and data information in a PSSCH. For example, the preemption indication information can be encoded separately from the data information and then both can be multiplexed in a same PSSCH. For the mapping, the encoded data information is rate matched in PSSCH resources after the encoded preemption indication information. The encoded preemption indication information bits can be mapped on PSSCH resource elements and then the encoded data is mapped. When a CSI report or a CSI-RS or a PTRS is multiplexed in the PSSCH, the resource elements that the encoded preemption indication information occupies may not overlap with the resource elements of the CSI report or of the CSI-RS or of the PTRS. When a number of preemption indication information bits is between 3 and 11, Reed Muller coding can be used while when a number of preemption indication information bits is more than 11, polar coding can be used.

As another example, the preemption indication information can be provided by a MAC-CE message that is included in a PSSCH transmission. As yet another example, the preemption indication information can be provided by an RRC message that is included in a PSSCH transmission.

In various embodiments, a reservation signal can be used for reserving resources prior to a transmission. In one embodiment, the resource reservation information can be conveyed by a SCI format in a PSCCH that does not schedule a PSSCH transmission. In another embodiment, the resource reservation information can be conveyed by a PSSCH transmission scheduled by a SCI format in a PSCCH transmission, wherein whether or not the PSSCH transmission includes SL-SCH data can be additionally indicated by a field in the SCI format.

In various embodiments, resource reservation information and data information can be multiplexed in a PSSCH transmission. The resource reservation information can be encoded separately from the data information. For mapping, the UE 116 rate matches the encoded data information to PSSCH resource elements after rate matching the encoded resource reservation information. When a CSI report or a CSI-RS or a PTRS are also transmitted in the PSSCH, the resource elements for the encoded resource reservation information may not overlap with resource elements for the CSI report or the CSI-RS or the PTRS. When a number of resource reservation information bits is between 3 and 11, Reed Muller coding can be used and when the resource reservation information bits are more than 11, polar coding can be used.

In another example, the resource reservation information can be provided by a MAC-CE message that is included in the PSSCH. In yet another example, the resource reservation information can be provided by an RRC message that is included in the PSSCH.

Various embodiments of the present disclosure enable Mode 1 resource allocation for a configured grant PSSCH transmission or for a PSSCH transmission scheduled by a SCI format, time/frequency domain resource indication, CSI report for multiple destination UEs, BSR reporting, indication by a DCI format for multiple destination UEs, HARQ-ACK information, a DCI format for NR Uu controlling LTE sidelink, and timing offset for NR Uu controlling LTE sidelink. The various embodiments can be used for resource sensing in New Radio Interface/Access (NR) Vehicle-to-Everything (V2X) resource allocation.

For example, embodiments of the present disclosure provide mechanisms for signaling of configured grant type 2 PSSCH transmission, where a DCI format activating the PSSCH transmission can indicate one or more of a modulation and coding scheme (MCS), enable/disable HARQ-based retransmission resource reservation, indicate the HARQ-ACK information reporting option for groupcast (NACK only or either ACK or NACK), and indicate resources for an initial transmission and retransmission of a TB. When TB retransmission is enabled, the DCI format can also indicate a maximum number of retransmissions for the TB. In addition, for configured grant type 2 PSSCH transmissions, the DCI format can enable or disable HARQ-ACK information reporting, can indicate a retransmission type, such as HARQ-ACK information based retransmission or blind retransmission, a number of retransmissions for a single TB, and time, frequency, or code domain resources for PSFCH transmission. Also, some or all of the above parameters can be indicated by RRC signaling for configured grant type 2 and type 1 PSSCH transmissions.

Embodiments of the present disclosure further provide signaling of a DCI format in a PDCCH transmission. The DCI format can indicate a MCS for a PSSCH transmission, enable/disable HARQ-based retransmission resource reservation, indicate a HARQ-ACK information reporting option for groupcast (NACK only or either ACK or NACK), indicate whether HARQ-ACK information reporting is enabled or disabled (HARQ feedback based retransmission or blind retransmission), indicate a number of retransmissions for a single TB, and indicate time, frequency, or code domain resources for a PSFCH transmission.

Embodiments of the present disclosure further provide a time domain indication for resources of a TB retransmission in a PSSCH, where the time domain gap between two consecutive PSSCH transmissions with a same TB can be the same or different and can be indicated by a DCI format activating PSSCH transmissions for configured grant 2, and/or by RRC signaling for PSSCH transmissions with configured grant type 1 or configured grant type 2.

Embodiments of the present disclosure further provide a frequency domain indication for resources of a TB retransmission in a PSSCH, where the frequency domain gap between two consecutive PSSCH transmissions with a same TB can be the same or different, as indicated by a DCI format activating PSSCH transmissions for configured grant 2, and/or RRC signaling for PSSCH transmissions with configured grant type 1 or configured grant type 2.

Embodiments of the present disclosure further provide mechanisms for CSI reports from multiple destination UEs. The transmitter UE 116 provides to the serving gNB 102 a CSI report that includes a separate CSI report for each destination UE. The CSI report can additionally or alternatively include a single CSI report for all destination UEs.

Embodiments of the present disclosure further provide mechanisms for BSR reporting and DCI format indication for multiple destination UEs. When the gNB 102 indicates a resource to the UE 116 for the UE 116 to transmit PSCCH/PSSCH to a destination UE, the gNB 102 can indicate in the DCI format the destination UE. An index can be included in each BSR provided to the gNB 102 to indicate a different destination UE and the gNB 102 can indicate a resource corresponding to a BSR (or to a destination UE) by a corresponding index in the DCI format.

Embodiments of the present disclosure further provide mechanisms for HARQ-ACK information reporting to the gNB for multiple destination UEs. When UE 116 provides to gNB 102 HARQ-ACK information for multiple destination UEs, the UE 116 can multiplex the HARQ-ACK information in a same PUCCH or PUSCH transmission. Each HARQ-ACK information in the same PUCCH or PUSCH transmission is assigned an index. The gNB can indicate a resource corresponding to a HARQ-ACK information index and, when needed, indicate in the DCI format a resource for a TB retransmission and the corresponding HARQ-ACK information index. Based on the DCI format reception, the UE 116 can determine the destination UE and the resource to use for transmitting a corresponding PSSCH.

Embodiments of the present disclosure further provide a DCI format for NR Uu controlling LTE sidelink. Different DCI formats can be used for both NR Uu over NR sidelink and for NR Uu over LTE. Different RNTIs for NR sidelink and LTE sidelink can be used to scramble the CRC bits of the DCI format to distinguish between NR and LTE sidelink. The DCI formats for both NR Uu over NR sidelink and NR Uu over LTE have a same payload size with zeros padded (appended), when needed to obtain a same size for the DCI formats, in the DCI format having a smaller number of information bits prior to padding.

Embodiments of the present disclosure further provide mechanisms for indicating a timing offset for NR Uu controlling LTE sidelink. In order to reduce signaling for DCI formats over LTE sidelink for activation/deactivation of PSSCH transmissions, a value of X can be implicitly assumed and applied by the UE that detects the DCI format. There may be no explicit indication of the value X in the DCI format activating the PSSCH transmissions. The value of X can be reported by the UE to the gNB by higher layer signaling. A table of values of X can be specified or (pre)configured.

As described herein, one or more parameters can be indicated by a DCI format activating PSSCH transmissions for configured grant type 2. For example, when UE 116 provides a CSI report to gNB 102, the gNB 102 can use the CSI report to determine a MCS for data information in a PSSCH transmission. The DCI format activating PSCCH transmissions for configured grant Type 2 can indicate a corresponding MCS. As another example, such as for a heavily loaded system, HARQ-based retransmission resource reservation can be disabled; otherwise, HARQ-based retransmission resource reservation can be enabled. The DCI format activating PSSCH transmissions for configured grant Type 2 can indicate whether HARQ-based retransmission resource reservation is enabled or disabled. When HARQ-based retransmission resource reservation is disabled, the HARQ-based retransmission resource may not be reserved in the DCI format.

As another example, when there are two groupcast type HARQ-ACK information report options (for NACK only or for either ACK or NACK), the DCI format activating PSSCH transmissions can indicate one of the two options. The DCI format can also indicate PSSCH resources for an initial transmission of a TB and for retransmission of a TB. When TB retransmission is enabled, the DCI format can also indicate a maximum number of PSSCH retransmissions for a TB. As another example, the DCI format can enable or disable HARQ-ACK information reporting. When disabled, HARQ-based retransmission resources are not reserved. The type of retransmission can be based on HARQ-ACK feedback information or can be a blind retransmission.

In some embodiments, one or more of the example parameters described herein can be indicated by RRC signaling for configured grant Type 2. In some embodiments, one or more of the example parameters described herein can be indicated by RRC signaling for configured grant Type 1.

In some embodiments, a sidelink PSFCH resource can be indicated by the gNB 102. For sidelink PSFCH resource allocation, multiple PSFCH resources can be associated with unicast PSSCH transmissions and with groupcast PSSCH transmissions with HARQ-ACK reporting of either ACK or NACK in a PSFCH period (N>1). Therefore, for Mode 1 configured grant type 2 resource allocation, embodiments of the present disclosure recognize the need to specify a resource for a PSFCH transmission with HARQ-ACK information when there are multiple PSFCH resources associated with a PSCCH/PSSCH transmission. In some embodiments, a frequency domain or a code domain resource for a PSFCH transmission can be indicated by a DCI format activating the PSSCH transmission. When receiving the DCI format, the transmitter UE 116 can use the indicated frequency domain resource or code domain resource for PSFCH resource allocation.

As described herein, one or more parameters can be indicated by the DCI format. For example, when CSI is reported from the UE 116 to the gNB 102, the gNB 102 can have CSI information for sidelink PSCCH/PSSCH transmissions by UE 116 and the gNB 102 can determine an MCS for each of the sidelink PSCCH/PSSCH transmissions. As another example the DCI format can indicate whether HARQ-based retransmission resource reservation is enabled or disabled. For example, for a system that is heavily loaded, HARQ-based retransmission resource reservation can be disabled; otherwise, HARQ-based retransmission resource reservation can be enabled. When HARQ-based retransmission resource reservation is disabled, the HARQ-based retransmission resource is not reserved by the DCI format.

As another example, the DCI format can indicate an option for HARQ-ACK reporting for groupcast PSSCH receptions such as a PSFCH transmission only when the HARQ-ACK information has a NACK value or a PSFCH transmission regardless of a value of an associated HARQ-ACK information (either ACK or NACK). The DCI format can additionally indicate whether reporting of HARQ-ACK information is enabled or disabled. When disabled, HARQ based retransmission resources are not reserved. There can be two types of retransmission, a first type based on reported HARQ-ACK information and a second type that does not depend on reported HARQ-ACK information (blind retransmission).

In some embodiments, a PSFCH resource can be indicated by the gNB 102. For sidelink PSFCH resource allocation, there can be multiple PSFCH resources associated with unicast PSCCH/PSSCH transmissions and with groupcast PSSCH/PSSCH transmissions with HARQ-ACK information reporting regardless of the HARQ-ACK value in a PSFCH period (N>1). Accordingly, various embodiments of the present disclosure recognize the need to determine a resource for a PSFCH transmission when there are multiple such resources. The frequency domain or code domain resource for a PSFCH transmission can be indicated by the DCI format.

Various embodiments of the present disclosure further provide a time domain indication for transmission and retransmission resources for a PSSCH with a same TB. For example, a DCI format provides resources for one or multiple sidelink PSSCH transmissions of a TB. PSSCH retransmission resources for the TB are indicated by the DCI format. A time domain gap between two consecutive transmissions for a same TB can be same or different. For example, a first time gap between an initial PSSCH transmission with a TB and a second PSSCH transmission with the TB and a second time gap between the second PSSCH transmission with the TB and a third PSSCH transmission with the TB can be the same or different. The time domain indication can be beneficial when resources available for transmissions of a TB are not evenly spaced in time. The DCI format can also be used for configured grant type 2 PSSCH transmissions where, for example, the DCI format activating the PSSCH transmissions can indicate the time domain resources for transmissions of a TB.

For a configured grant type 1 where RRC configuration is used for resource configurations, time domain resources for transmissions of a TB can be configured by RRC signaling. For a configured grant type 2, time domain resources for transmissions of a TB can be configured. In case of multiple configured time resources, a time domain resource can be indicated by the DCI format activating the PSSCH transmission.

In one embodiment for the time domain indication for transmission or retransmission resources of a PSSCH with a TB, the time gap between any two consecutive PSSCH transmissions with the TB is same. When the time gap is same, there is only one time gap field in each DCI format activating a configured grant 2 PSSCH transmission or in RRC signaling for configured grant type 1 or configured grant type 2 PSSCH transmission for indicating the time domain resource for all transmissions of a same TB.

Figure 13:
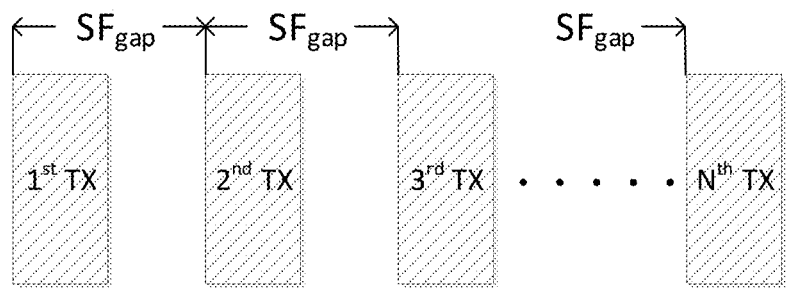
FIG. 13 illustrates time gaps between PSSCH transmissions of a same TB according to various embodiments of the present disclosure.

FIG. 13 illustrates time gaps between PSSCH transmissions of a same TB according to various embodiments of the present disclosure. As shown in FIG. 13, the time gap is same between any two consecutive PSSCH transmissions of a same TB. The field $SF_{gap}$ indicates a time gap between any two consecutive PSSCH transmissions. The time domain gap can be in unit of slots or in a unit of a number of consecutive slots, or in milliseconds and can be configured by RRC signaling or be predetermined in the system operation. The embodiment of the time gaps between PSSCH transmissions shown in FIG. 13 is for illustration only. Other embodiments can be used without departing from the scope of the present disclosure.

PSSCH transmissions for a single TB can be in consecutive slots. When the PSSCH transmissions are in consecutive slots, a time domain gap between any two consecutive transmissions is 1, or a number of consecutive slots for a PSSCH transmission. Alternatively, the time domain gap can be indicated by the DCI format or the RRC signaling with the time domain gap equal to 1 in terms of slots or number of consecutive slots for a PSSCH transmission.

In another embodiment for the time domain indication for PSSCH resources associated with an initial transmission or a retransmission of a TB, the time gap between any two consecutive transmissions for the TB can be different. When the time gap can be different, time gap fields in the DCI format can indicate the separate time gaps for a corresponding PSSCH transmission.

Figure 14:
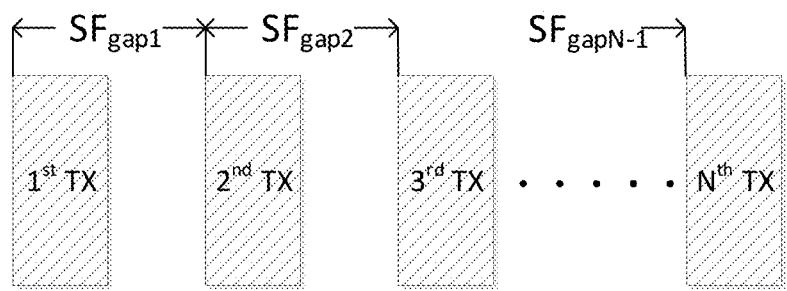
FIG. 14 illustrates time gaps between transmissions of a same TB according to various embodiments of the present disclosure.

FIG. 14 illustrates time gaps between transmissions of a same TB according to various embodiments of the present disclosure. As shown in FIG. 14, a time gap can be different between any two consecutive transmissions for a same TB. For example, $SF_{gap1}$ indicates the time gap between a first PSSCH transmission with a TB and a second PSSCH transmission with the TB while $SF_{gap2}$ indicates the time gap between the second PSSCH transmission with the TB and a third PSSCH transmission with the TB. The time domain gap can be in unit of slots or in a unit of a number of consecutive slots for a PSSCH transmission or in absolute time units such as milliseconds. The unit can be configured by RRC signaling or be predetermined in the system operation. The embodiment of the time gaps between transmissions shown in FIG. 14 is for illustration only. Other embodiments can be used without departing from the scope of the present disclosure.

Various embodiments of the present disclosure provide mechanisms for indicating a frequency domain resource for a transmission or a retransmission of a TB in a PSSCH. For example, a DCI format can provide resources for one or multiple sidelink transmissions of a PSSCH with a single TB. In these embodiments, retransmission resources for a PSSCH with the TB are indicated by a DCI format. A frequency domain gap between two consecutive PSSCH transmissions with a same TB can be same or different. For example, the frequency domain gap between a PSSCH with an initial transmission of a TB and a PSSCH with a first retransmission of the TB and the frequency domain gap between the PSSCH with the first retransmission of the TB and a PSSCH with a second retransmission of the TB can be same or different. An indication of the frequency domain gap can be beneficial when frequency resources available for transmissions of a TB are not evenly spaced.

The DCI format can provide resources for one or for multiple sidelink PSSCH transmissions with single TB for configured grant type 2 PSSCH transmissions where the DCI format can also perform the activation of the PSSCH transmissions. For configured grant type 1 where RRC configuration is used for resource configurations, the frequency domain resources for transmissions of a single TB can be configured by RRC signaling.

In some embodiments, the frequency domain gap between any two consecutive transmissions for a same TB can be same. Then, there is only one frequency domain gap field in a DCI format activating configured grant type 2 PSSCH transmissions or in RRC signaling for configured grant type 1 or configured grant type 2, to indicate the frequency domain resources of the all PSSCH transmissions for a same TB.

Figure 15:
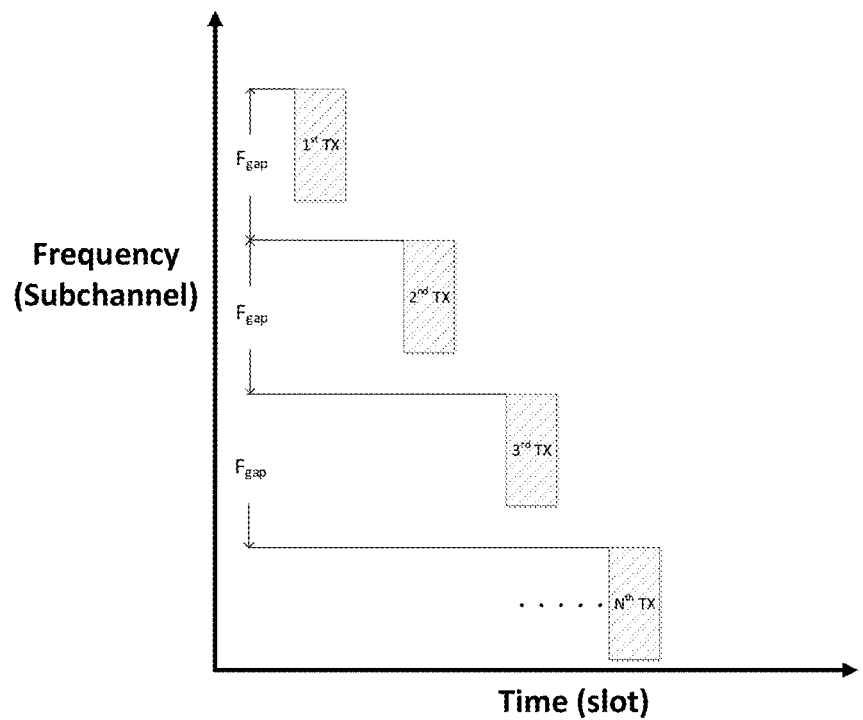
FIG. 15 illustrates frequency gaps between PSSCH transmissions for a TB according to various embodiments of the present disclosure.

FIG. 15 illustrates frequency gaps between PSSCH transmissions for a TB according to various embodiments of the present disclosure. As shown in FIG. 15, the frequency domain gap is the same between any two consecutive PSSCH transmissions for a same TB. The field $F_{gap}$ in the DCI format allocating resources for the PSSCH transmissions indicates the frequency domain gap between any two consecutive PSSCH transmissions. The frequency domain gap can be in a unit of subchannels that can be configured by RRC signaling or be predetermined in the system operation based on a total number of subchannels. In some embodiments, the PSSCH transmissions for a single TB can be in same frequency domain resources and the frequency domain gap between any two consecutive transmissions is zero. In such case, a corresponding indication can be omitted in the DCI format or in the RRC signaling for configured grant PSSCH transmissions. The embodiment of the frequency gaps between transmissions shown in FIG. 15 is for illustration only. Other embodiments can be used without departing from the scope of the present disclosure.

In some embodiments, the frequency domain gap between any two consecutive transmissions for a same TB can be different. Then, a frequency domain gap field value in a DCI format including a DCI format activating configured grant type 2 PSSCH transmissions, or in RRC signaling for configured grant type 1 or configured grant type 2 PSSCH transmissions, can indicate a frequency domain gap between two consecutive PSSCH transmissions.

Figure 16:
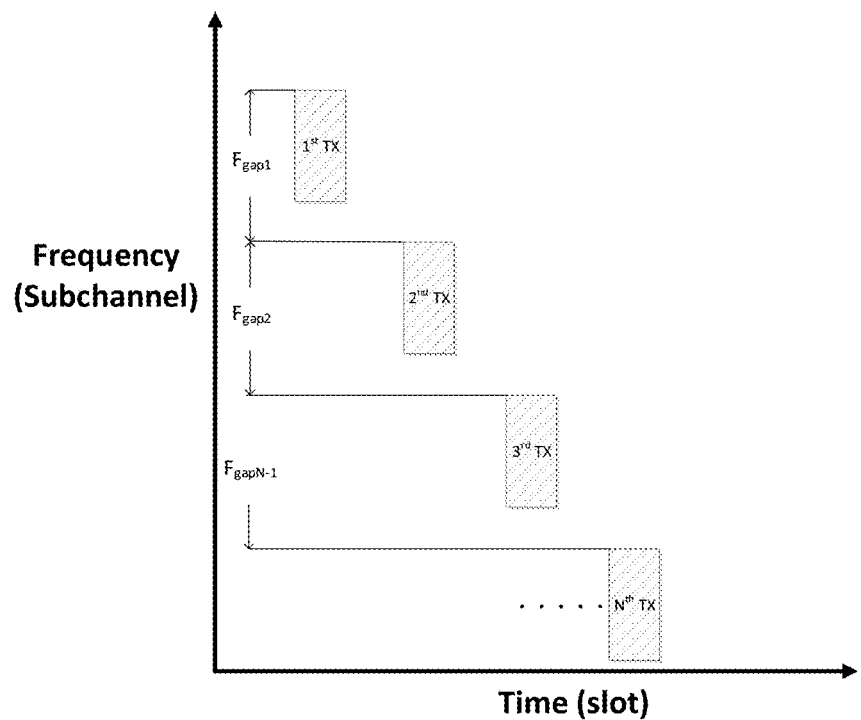
FIG. 16 illustrates frequency domain gaps between PSSCH transmissions for a TB according to various embodiments of the present disclosure.

For example, FIG. 16 illustrates frequency domain gaps between PSSCH transmissions for a TB according to various embodiments of the present disclosure. As shown in FIG. 16, the frequency domain gap is different between consecutive transmissions for a same TB. $F_{gap1}$ indicates a first frequency domain gap between an initial PSSCH transmission with a TB and a second PSSCH transmission with the TB. $F_{gap2}$ indicates a frequency domain gap between the second PSSCH transmission with the TB and a third PSSCH transmission with the TB, and so on. The frequency domain gap can be in a unit of number of subchannels wherein the unit can be configured or be predetermined in the system operation based on a total number of subchannels. The embodiment of the frequency gaps between transmissions shown in FIG. 16 is for illustration only. Other embodiments can be used without departing from the scope of the present disclosure.

Various embodiments of the present disclosure provide mechanisms for a CSI report for multiple destination UEs. For example, when a transmitter UE 116 has data to transmit to multiple destination UEs, the CSI report by the transmitter UE 116 to the gNB 102 can include CSI for transmissions from UE 116 to the multiple destination UEs.

In some embodiments, a separate CSI report is provided by the transmitter UE 116 to the gNB 102 for each destination UE. When each CSI report is provided at the physical layer, a corresponding number of required resources can be large when an explicit destination UE index is included in each CSI report. Alternatively, a CSI report can be provided by higher layers such as by a MAC CE or by RRC signaling. The same can apply for a CSI report provided by a destination UE to transmitter UE 116. When a BSR or a CSI report for a destination UE include an identity of the destination UE, the gNB 102 can allocate the resource to the transmitter UE 116 that transmits to the corresponding destination UE using the allocated resource.

In another embodiment, a single CSI report can be provided by the transmitter UE 116 to the gNB 102 for all destination UEs. For example, the single CSI report can be the report with the average CSI, or the best CSI, or the worst CSI among the CSI reports for all destination UEs. The gNB 102 can use the single CSI report to allocate the resource for the transmitter UE 116. For example, a single CSI report can be applicable for groupcast transmission.

Various embodiments of the present disclosure provide BSR reporting and corresponding DCI format indication for multiple destination UEs. For example, when a transmitter UE 116 has data to transmit to different destination UEs, the transmitter UE 116 can provide to the gNB 102 a BSR report separately for each destination UE. When the gNB 102 schedules/indicates the resource for the transmitter UE 116 for PSSCH transmission to a destination UE, the gNB 102 can indicate, for example in the corresponding DCI format, the destination UE that the transmitter UE 116 transmits a PSSCH to using the indicated resource.

Each BSR can include an index for a corresponding destination UE. The index in each BSR is not necessarily same as the destination UE index and an association can be determined by the transmitter UE. For example, index 0 for a BSR can indicate destination UE a, while index 1 for a BSR report can indicate destination UE b. The gNB 102 can schedule a resource corresponding to a BSR report and indicate, in the DCI format, the resource and the corresponding index. When receiving the DCI format, the transmitter UE 116 can determine the destination UE for transmitting a PSSCH to using the indicated resource.

Figure 17:
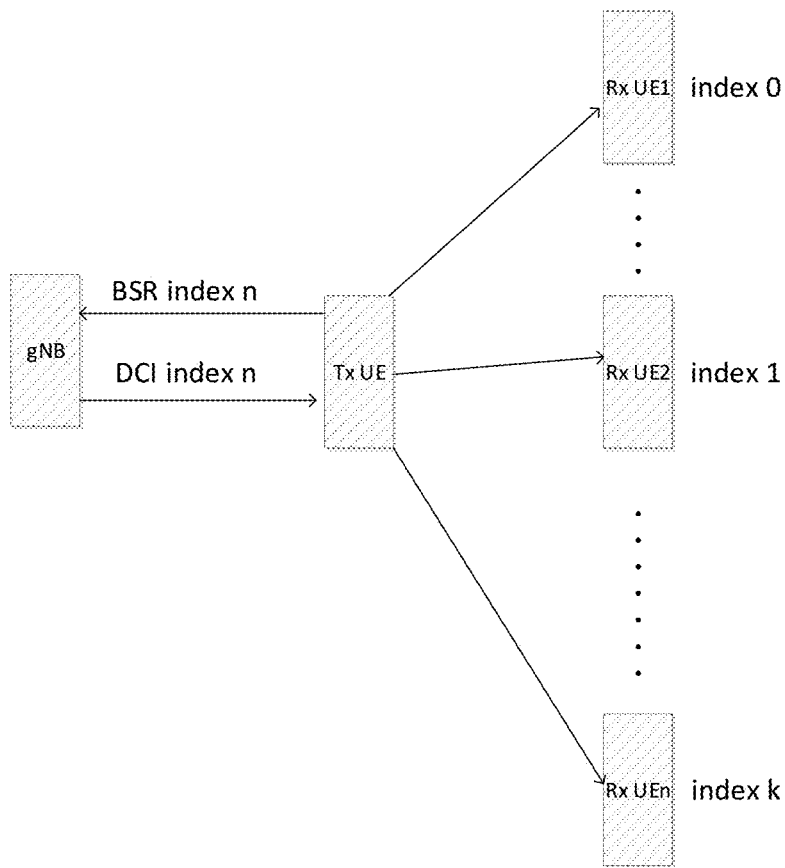
FIG. 17 illustrates a gNB and a transmitter UE according to various embodiments of the present disclosure.

FIG. 17 illustrates a gNB and a transmitter UE according to various embodiments of the present disclosure. The embodiment of the gNB and a transmitter UE shown in FIG. 17 is for illustration only. Other embodiments can be used without departing from the scope of the present disclosure.

When the transmitter UE 116 has data to transmit to a destination UE, an index can be assigned to the destination UE. The transmitter UE 116 sends a BSR with an index n corresponding to the destination UE. The gNB 102 schedules/indicates a resource to the transmitter UE 116 and indicates in the DCI format the index n. When the transmitter UE 116 receives/detects the DCI format, the transmitter UE 116 transmits a PSSCH to the destination UE using the indicated resource.

Various embodiments of the present disclosure provide HARQ-ACK information and DCI format indication for multiple destination UEs. For example, a retransmission resource can be allocated by the gNB 102 to the transmitter UE 116 for a PSSCH transmission when the gNB 102 receives a NACK from the UE 116 for a TB in a previous PSSCH transmission. When multiple HARQ-ACK information bits are reported by the transmitter UE 116 to the gNB 102, the multiple HARQ-ACK information bits can be multiplexed in a same PUCCH resource. Each HARQ-ACK in the same HARQ-ACK codebook can be allocated an index by the transmitter UE 116.

In some embodiments, the gNB 102 can schedule a resource corresponding to a HARQ-ACK index and indicate, in the DCI format, the resource for a PSSCH transmission and the corresponding index. When receiving the DCI format, the transmitter UE 116 can know the destination UE and transmit a PSSCH to the destination UE using the resource indicated by the DCI format.

Figure 18:
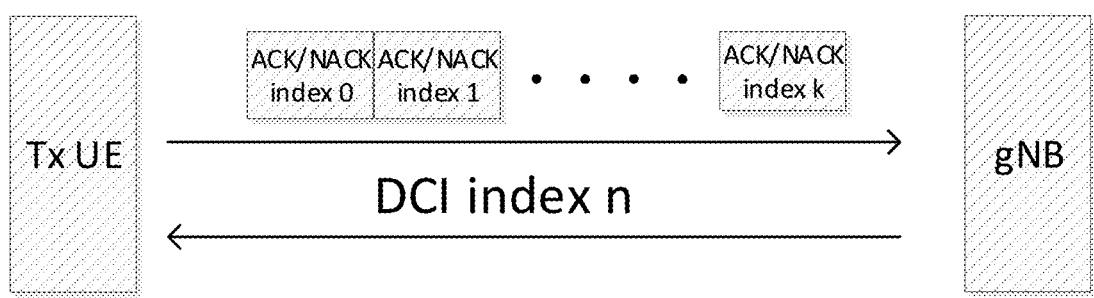
FIG. 18 illustrates a transmitter UE and a gNB according to various embodiments of the present disclosure.

FIG. 18 illustrates a transmitter UE and a gNB according to various embodiments of the present disclosure. The transmitter UE can be the UE 116 and the gNB can be the gNB 102. The embodiment of the gNB and a transmitter UE shown in FIG. 18 is for illustration only. Other embodiments can be used without departing from the scope of the present disclosure.

In the example of FIG. 18, when the transmitter UE 116 has HARQ ACK information to report to the gNB 102 for requesting a resource to retransmit a TB or to transmit a new TB to destination UEs, such as the UEs 111-115, an index can be implicitly assigned to each HARQ-ACK information bit that is related with the corresponding destination UE 111-115. Then, the gNB 102 schedules/indicates a resource for the transmitter UE 116 and indicates, in the DCI format, the index n. When the transmitter UE 116 receives the DCI format, the transmitter UE 116 transmits the PSSCH to a destination UE, from the destination UE 111-115, as determined by the index n using the resource.

Various embodiments of the present disclosure provide a DCI format for NR Uu controlling LTE sidelink. For example, when a new DCI format other than NR DCI format controlling NR Uu is used to control sidelink resources, the new DCI format can control both or either NR sidelink resources and/or LTE sidelink resources. In various embodiments, a new DCI format can control LTE sidelink resources.

For example, different DCI formats can be used for NR Uu over NR sidelink and NR Uu over LTE. Different RNTIs for NR sidelink and LTE sidelink are used to scramble the CRC bits of the DCI formats to distinguish between NR and LTE sidelink. To reduce a decoding complexity/number of decoding operations for DCI formats that a UE needs to perform, the disclosure considers that the DCI formats for both NR Uu over NR sidelink and NR Uu over LTE have a same payload size. If a number of information bits in one of the two DCI formats is less than in the other of the two DCI formats, zeros are appended to the DCI format with a fewer number of information bits until both DCI formats have same size.

As another example, a same DCI format can be used for both NR Uu over NR sidelink and NR Uu over LTE. Then, a same RNTI for both NR sidelink and LTE sidelink is used to scramble the CRC bits of the DCI format. A field in the DCI format can distinguish between NR and LTE sidelink. The contents/fields of the DCI format can be interpreted differently according to the field that indicates whether the DCI format is for NR sidelink or for LTE sidelink.

Various embodiments of the present disclosure provide a timing offset for NR Uu controlling LTE sidelink. For example, for NR Uu controlling LTE sidelink, the UE 116 that receives in a subframe a DCI format activating a PSSCH transmission, transmits the PSSCH in a first LTE subframe after Z+X ms from the subframe of the PDCCH reception that provides the DCI format where Z is a timing offset defined in LTE V2X specifications and X>0. The value of X indicates a scheduling latency that results from a coordination latency between a NR module and a LTE module at UE 116. To reduce the signaling requirements for a DCI format over the LTE sidelink for activation or deactivation of PSSCH transmissions, a value of X can be predetermined and may not be explicitly indicated by the DCI format activating the PSSCH transmission.

In some embodiments, the UE 116 can report the value of X to the gNB 102 by higher layer signaling or as part of a UE capability. Then, the gNB 102 can allocate the LTE sidelink resources accordingly based on the value of X. Since different UEs have different coordination latency between a NR module and a LTE module, a table of values for X can be predefined, specified, or configured. For example, in Table 11, at least a value of X exists that can be interpreted as "LTE PC5 scheduling by NR Uu not supported by DCI format activating PSSCH transmissions" and can be provided by a UE as part of reporting of UE capabilities.

TABLE 11

| X | Values |
|---|---|
| xxx | 1 |
| xxx | 2 |
| xxx | 8 |
| xxx | 12 |
| xxx | LTE scheduling by NR Uu not supported |

Various embodiments of the present disclosure provide mechanisms for indicating preemption/cancellation of scheduled transmissions on sidelink. For example, when the gNB 102 schedules a sidelink resource for UE 116, and the sidelink resource is reserved (partly or fully) by another UE from UEs 111-115 with a lower priority, the gNB 102 can indicate via the Uu link to UE 116 to preempt the sidelink resource that is reserved by the other UE. The UE 116 can transmit a preemption indication over the sidelink to inform other UEs 111-115 that the sidelink resource is preempted by the UE 116.

In some embodiments, the preemption information can be provided by the DCI format that schedules the sidelink resource for the UE 116. A field in the DCI format can indicate that the sidelink resource that the DCI format schedules is a sidelink resource that the UE 116 should preempt.

In some embodiments, the preemption information can be provided by the DCI format that schedules another sidelink resource for the UE 116. The sidelink resource that the DCI format schedules is not a sidelink resource that the UE 116 should preempt.

In some embodiments, a separate DCI format can be used to provide a preemption indication.

Wider bandwidth that is available in frequency range 2 (FR2), corresponding to frequency bands above 6 GHz such as the millimeter wave bands, can be used to improve data rates. In FR2, transmission beams can be used to improve received signal energy by a transmitter UE via beamforming in a specific direction to the receiver UE. However, efficient beam management is required for sidelink. Therefore, various embodiments of the present disclosure recognize and consider the need to specify a beam management procedure for NR sidelink. In the following, the term beam is used for brevity to refer to a transmission configuration indicator (TCI) state that corresponds to a set of quasi-collocation properties for a transmission.

The present disclosure considers transmission of a reservation signal. The reservation signal is used for sensing purposes and is broadcast from a transmitter UE to all other UEs in a system, such as the wireless network 100, or to a group of UEs within the range of the transmitter UE. The reservation signal can be transmitted using multiple beams. The present disclosure further provides mechanisms for beam indication by a reservation signal. When the reservation signal is transmitted using multiple beams and the associated PSCCH/PSSCH is of unicast type, each beam provides a same beam indication for the associated PSCCH/PSSCH transmission. When the reservation signal is transmitted using multiple beams and the associated PSCCH/PSSCH transmission is not a unicast type (e.g., it is broadcast/groupcast type), each beam provides a beam indication for the associated PSCCH/PSSCH transmission.

The present disclosure further provides a first stage SCI format. The first stage SCI format is for a sensing purpose and is broadcasted by a transmitter UE to all other UEs in the system, such as the network 100, or to a group of UEs within the range of the transmitter UE. The first stage SCI format is provided by PSCCHs that are transmitted in multiple beam directions (beam sweeping using different TCI states for the PSCCH transmissions). The present disclosure further provides beam indication of a second stage SCI format. The first stage SCI format also indicates a beam (TCI state) that is used by the transmitter UE 116 to transmit a PSCCH with the second stage SCI format or to transmit a PSSCH.

The present disclosure further provides mechanisms for beam measurement and reporting. A multi-beam CSI-RS is configured and transmitted by a transmitter UE, such as UE 116, to a receiver UE. The receiver UE performs beam measurement and reports the beam measurement result to the transmitter UE. For example, the receiver UE reports N selected CSI-RS resource indicators (CRIs) and corresponding L1-RSRP from a set of CSI-RS resources. The present disclosure further provides mechanisms for beam indication of PSFCH transmission. The UE that transmits PSCCH/PSSCH also includes in a SCI format scheduling the PSSCH transmission an indication for a beam to be used by the UE that transmits the associated PSFCH in response to the PSCCH/PSSCH reception.

The present disclosure further provides mechanisms for resource allocation. The resource allocation for a PSCCH/PSSCH transmission using multiple beams can be performed separately for each beam. Resource exclusion can be performed separately for different beam used for receptions and RSRP/RSSI is calculated based upon each corresponding receiver beam in sensing and resource selection procedures. For a PSFCH transmission using multiple beams, the resource for a PSFCH transmission using a beam from the multiple beams can be associated with/determined from the beam used for a corresponding PSCCH/PSSCH reception.

As described herein, various embodiments of the present disclosure provide mechanisms to transmit a reservation signal. For example, the reservation signal can be used for reserving sidelink resources for PSCCH/PSSCH transmissions. When a UE, such as UE 116, transmits a reservation signal that is received by other UEs, the reservation signal can be used by other UEs to determine whether or not to exclude from transmissions resources that are reserved by the UE. The reservation signal can be for sensing purposes and can be broadcast by the transmitter UE to all other UEs in the network 100 or within a range of the transmitter UE. The reservation signal can be transmitted using multiple beams.

In one embodiment, a transmission of a reservation signal can be over several symbols of a slot where the reservation signal can be transmitted using a different beam per symbol or per number of symbols. For example, the number of symbols can be configured or can be predetermined in the system operation. For each transmission beam of the reservation signal, there can be an automatic gain control (AGC) at the beginning of the slot and a guard period (GP) at the end of the slot.

Figure 19:
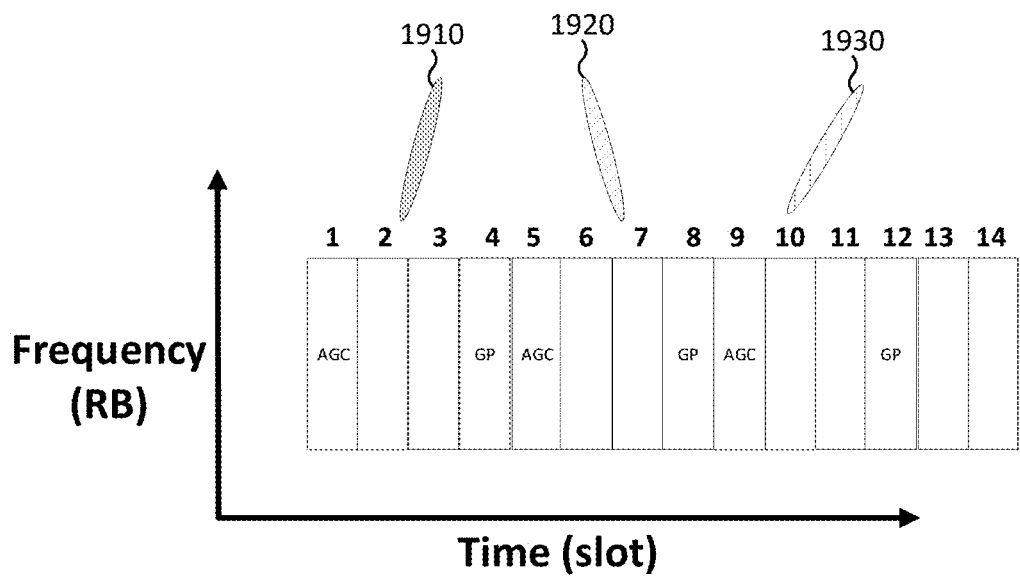
FIG. 19 illustrates transmission of a multi-beam reservation signal using multiple beams in one slot according to various embodiments of the present disclosure.

FIG. 19 illustrates a transmission of reservation signal using multiple beams in one slot according to various embodiments of the present disclosure. As shown in FIG. 19, the UE 116 transmits the reservation signal using three transmission beams 1910, 1920, and 1930 in a slot. The embodiment of the multi-beam transmission for the reservation signal shown in FIG. 19 is for illustration only. Other embodiments can be used without departing from the scope of the present disclosure.

In some embodiments, a reservation signal can be transmitted over multiple slots. Each transmission beam for the reservation signal can be used in each slot. For each transmission beam of the reservation signal, there can be an AGC at the beginning of the slot and a GP at the end of the slot.

Figure 20:
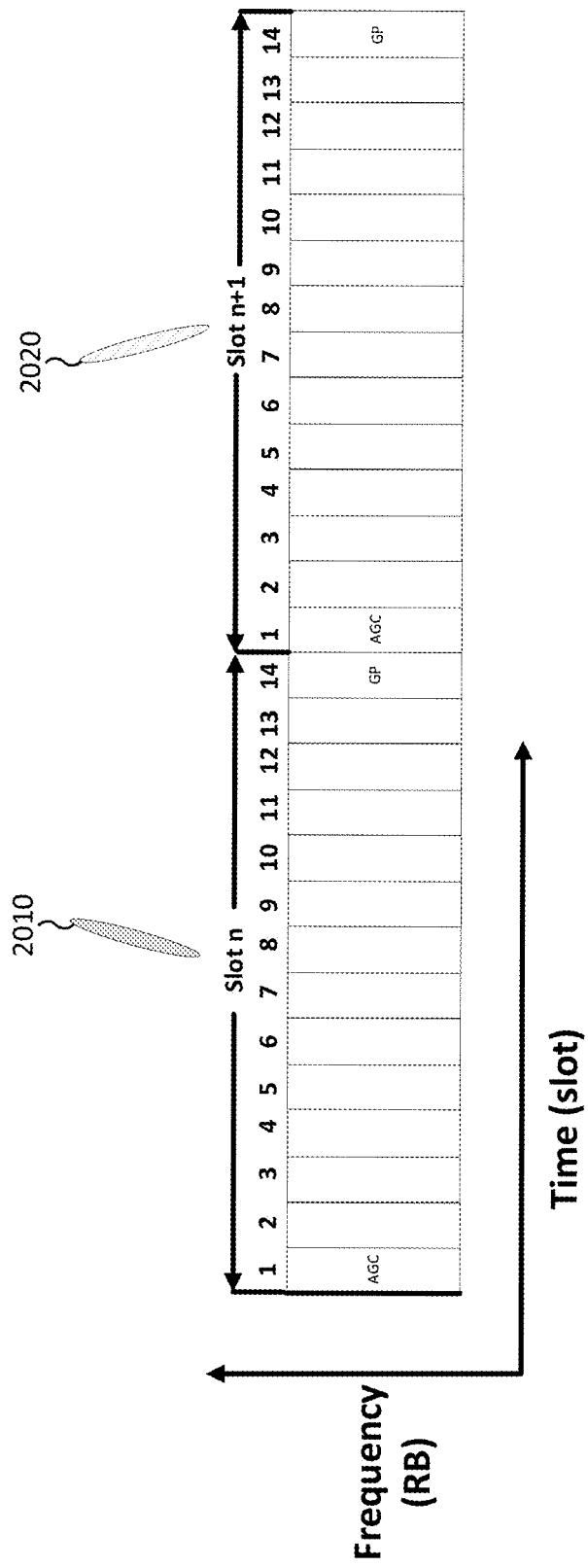
FIG. 20 illustrates a reservation signal that is transmitted using multiple beams in corresponding multiple slots according to various embodiments of the present disclosure.

FIG. 20 illustrates a reservation signal that is transmitted using multiple beams in corresponding multiple slots according to various embodiments of the present disclosure. As shown in FIG. 20, the UE 116 transmits the reservation signal using two beams 2010, 2020 in two corresponding slots. More particularly, the UE 116 transmits the reservation signal using beam 2010 in slot n and using beam 2020 in slot n+1. The embodiment of the multi-beam transmission for the reservation signal shown in FIG. 20 is for illustration only. Other embodiments can be used without departing from the scope of the present disclosure.

Various embodiments of the present disclosure provide mechanisms for beam indication by a reservation signal. The reservation signal can indicate a transmission beam that is used by the transmitter UE 116 to transmit an associated PSCCH/PSSCH. In embodiments where the reservation signal transmission is from multiple beams and the associated PSCCH/PSSCH is of a unicast type, a beam for the reservation signal transmission provides a same transmission beam indication for the associated PSCCH/PSSCH. In embodiments where the reservation signal transmission is from multiple beams and the associated PSCCH/PSSCH is not a unicast type (e.g., it is broadcast type or groupcast type), each beam for the reservation signal transmission provides a same transmission beam indication for the associated PSCCH/PSSCH transmission.

Figure 21:
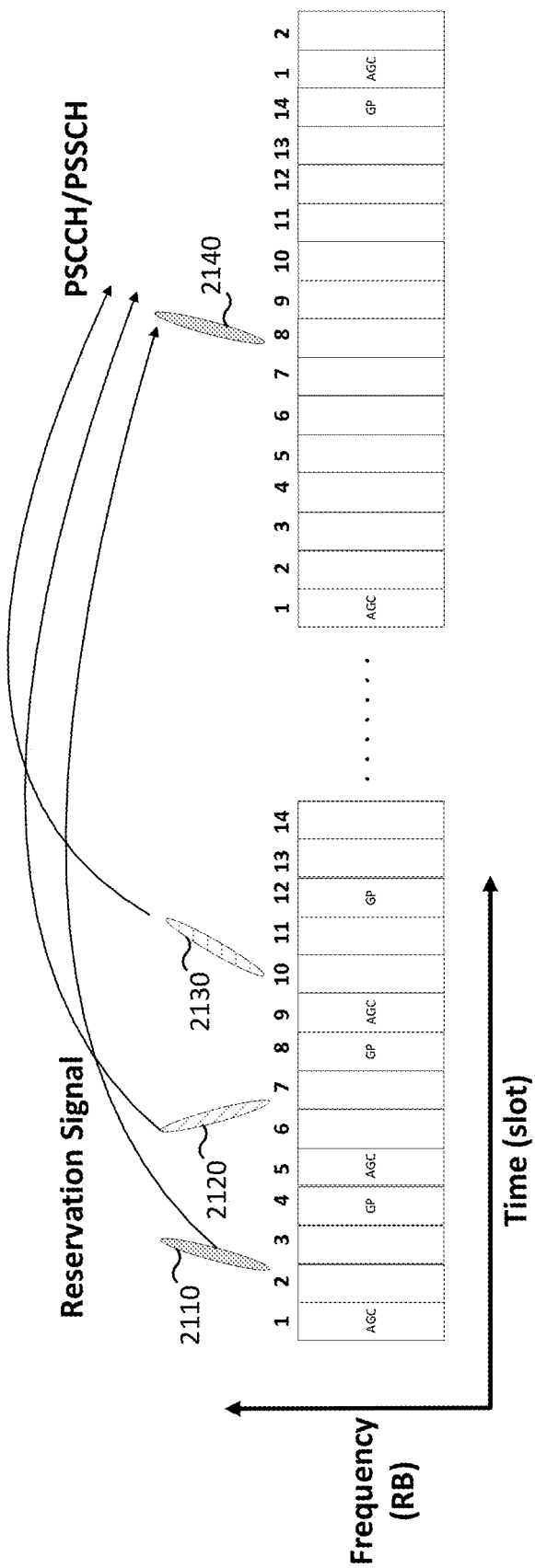
FIG. 21 illustrates a reservation signal indicating one beam for a PSCCH/PSSCH transmission according to various embodiments of the present disclosure.

FIG. 21 illustrates a reservation signal indicating one beam for a PSCCH/PSSCH transmission according to various embodiments of the present disclosure. FIG. 21 illustrates a reservation signal that is transmitted using three beams 2110, 2120, and 2130. The reservation signal transmission using beams 2110, 2120, 2130 indicates one transmission beam 2140 for an associated PSCCH/PSSCH transmission, for example for groupcast or broadcast transmissions. The embodiment of the reservation signal shown in FIG. 21 is for illustration only. Other embodiments can be used without departing from the scope of the present disclosure.

Figure 22:
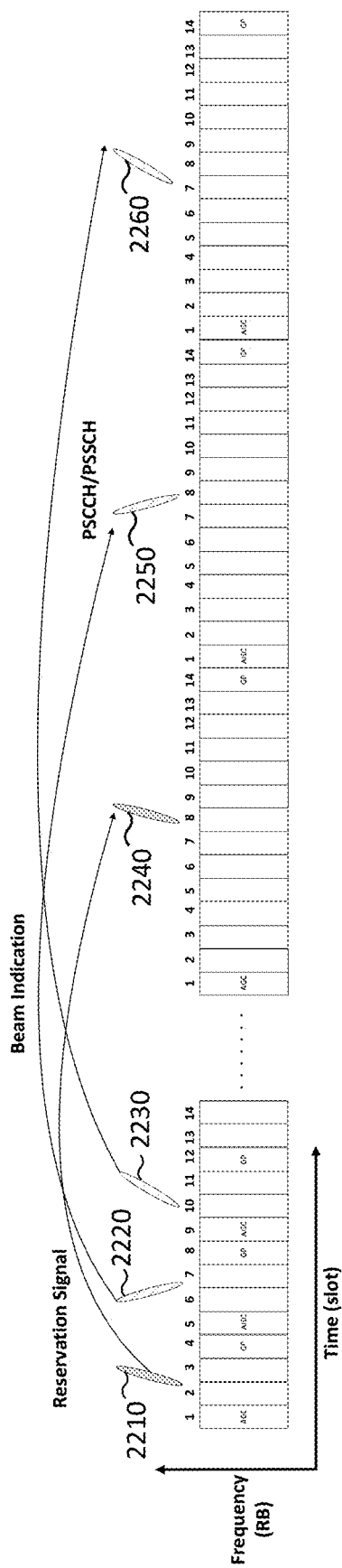
FIG. 22 illustrates a transmission of a reservation signal that indicates multiple transmission beams for associated PSCCH/PSSCH transmissions according to various embodiments of the present disclosure.

As another example, FIG. 22 illustrates a transmission of a reservation signal that indicates multiple beams for associated PSCCH/PSSCH transmissions according to various embodiments of the present disclosure. The embodiment of the reservation signal shown in FIG. 22 is for illustration only. Other embodiments can be used without departing from the scope of the present disclosure.

A reservation signal is transmitted using three beams 2210, 2220, and 2230. The reservation signal indicates multiple transmission beams 2240, 2250, and 2260 for associated PSCCH/PSSCH transmissions. The first beam 2210 indicates the transmission beam 2240, the second beam 2220 indicates the transmission beam 2250, and the third beam 2230 indicates the transmission beam 2260, for example, for unicast transmissions.

The transmission beam indicated by the reservation signal can be in the form of transmission configuration indicator (TCI) state (TCI-state) that contains parameters for configuring a quasi co-location relationship between the sidelink reference signals and the DM-RS ports of the corresponding PSCCH/PSSCH transmission. The quasi co-location relationship can be configured by the higher layer parameter qcl-Type for the sidelink reference signal. The sidelink reference signals can be provided either by an SSB-index for a SS/PBCH block or by a CSI-RS resource ID for a CSI-RS.

The TCI state field in a received reservation signal indicates the TCI state for the PSCCH/PSSCH reception. A UE uses the TCI-State according to the value of the TCI state field in the detected reservation signal to determine a PSCCH/PSSCH antenna port quasi co-location if a time between the reception of the reservation signal and the corresponding PSCCH/PSSCH reception is equal to or greater than a threshold provided by higher layer parameter Threshold-Sched-Offset. If the time between the reception of the reservation signal and the corresponding PSCCH/PSSCH reception is less than the threshold Threshold-Sched-Offset, the UE can assume that the DM-RS ports of PSCCH/PSSCH reception are quasi co-located with the RS(s) in the TCI state with respect to the QCL parameter(s) used for the reservation signal quasi co-location indication.

Figure 23:
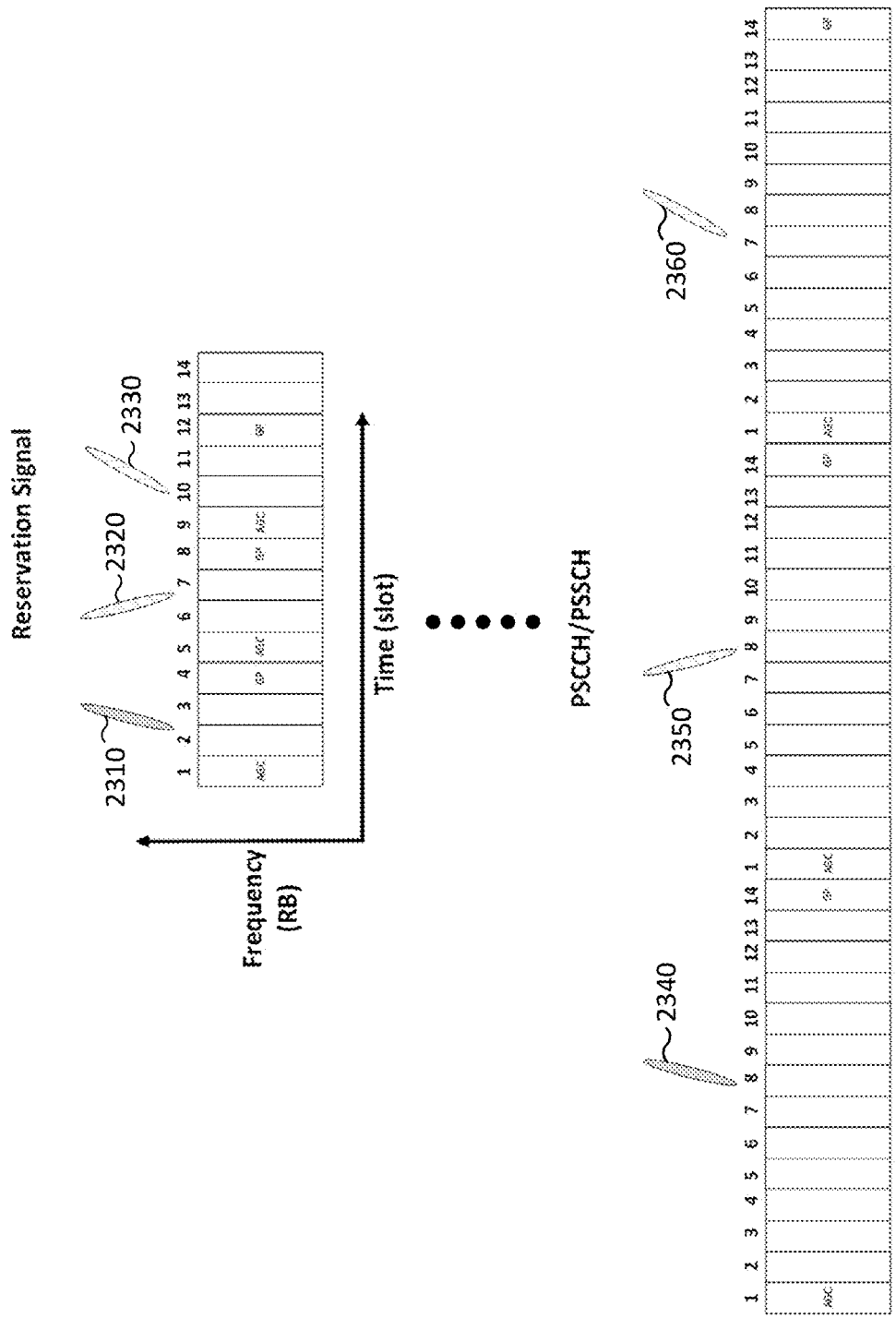
FIG. 23 illustrates a beam for a PSCCH/PSSCH reception that is associated with a reservation signal according to various embodiments of the present disclosure.

FIG. 23 illustrates a beam for a PSCCH/PSSCH reception that is associated with a reservation signal according to various embodiments of the present disclosure. The reservation signal is received using three beams 2310, 2320, and 2330. Beams 2340, 2350, and 2360 of the PSCCH/PSSCH reception are associated with the three beams 2310, 2320, and 2330, respectively, of the reservation signal when a time between the reception of the reservation signal and the corresponding PSCCH/PSSCH reception is less than a threshold provided by higher layer parameter Threshold-Sched-Offset. The embodiment of the reception beam shown in FIG. 23 is for illustration only. Other embodiments can be used without departing from the scope of the present disclosure.

Various embodiments of the present disclosure provide a first stage SCI format. The first stage SCI format can be used for sensing and reservation of sidelink resources for subsequent PSCCH/PSSCH transmission(s). When a UE transmits a PSCCH with the first stage SCI format that is received/detected by other UEs, the first stage SCI format can be used by the other UEs to determine whether or not to exclude from transmission resources that are reserved by the UE that transmits the PSCCH with the first stage SCI format. The first stage SCI format is for sensing purpose and can be broadcasted to all other UEs or to UE with the range of the transmitter UE. The PSCCH that includes the first stage SCI format can be transmitted using multiple beams.

In some embodiments, the PSCCH that provides the first stage SCI format can be transmitted/received over multiple slots using different beams in different slots. For each transmission/reception beam of the PSCCH, there can be an AGC at the beginning of the slot and a GP at the end of the slot. Similar, a PSSCH transmission/reception that is scheduled by the first stage SCI format can be over multiple slots with an AGC at the beginning of the slot and a GP at the end of the slot when PSCCH and PSSCH are multiplexed in the same slot and use same transmission and reception beams to transmit and receive, respectively.

Figure 24:
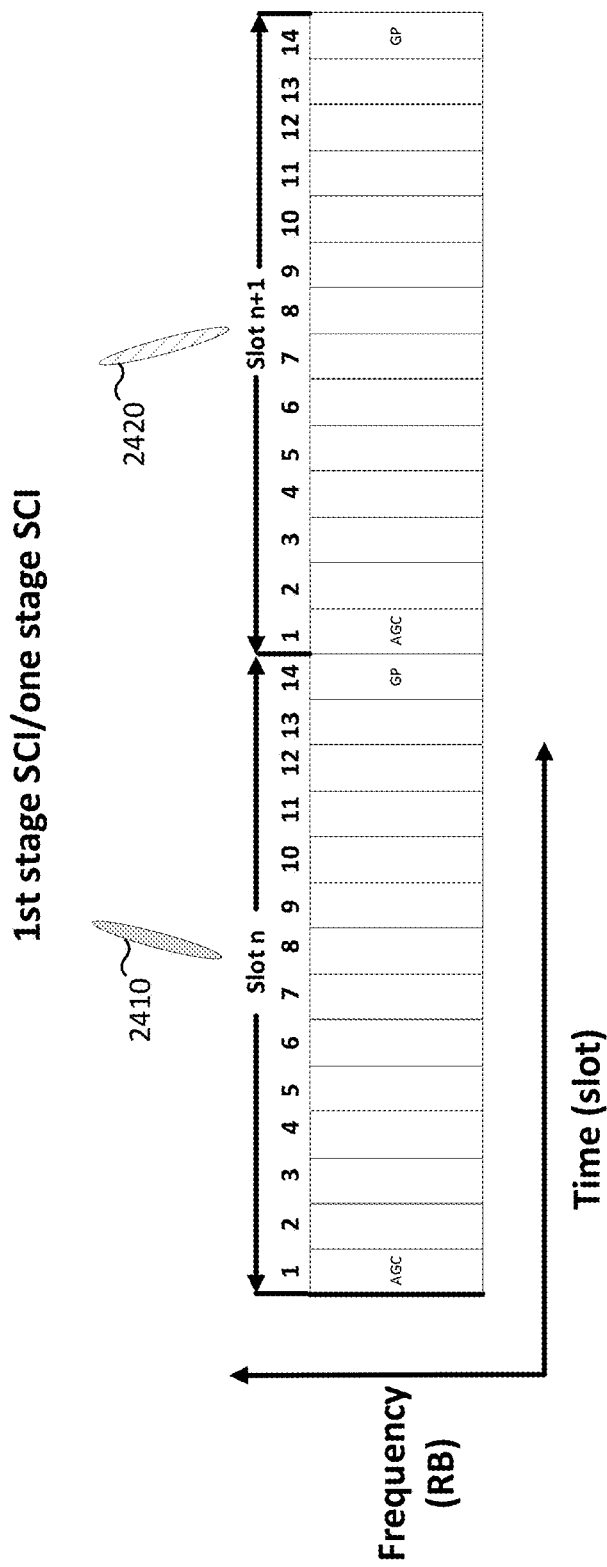
FIG. 24 illustrates a PSCCH transmission that provides a first stage SCI format using a different beam per slot over respective multiple slots according to various embodiments of the present disclosure.

FIG. 24 illustrates a PSCCH transmission that provides a first stage SCI format using a different beam per slot over respective multiple slots according to various embodiments of the present disclosure. The PSCCH transmission uses beam 2410 in slot n and beam 2420 in slot n+1. The embodiment of the PSCCH transmission that provides the first stage SCI format using a different beam per slot over respective multiple slots shown in FIG. 24 is for illustration only. Other embodiments can be used without departing from the scope of the present disclosure.

Various embodiments of the present disclosure provide mechanisms for a beam indication for a PSCCH reception that includes a second stage SCI format or for a PSSCH reception. For example, the PSCCH reception that provides the first stage SCI signal can be of broadcast type signal and can be used by other UEs for sensing. The first stage SCI format can indicate a beam that is used by the transmitter UE to transmit the PSCCH that provides the second SCI format and to transmit a PSSCH in resources indicated by the first stage SCI format. When the PSCCH that provides the first stage SCI format is transmitted/received using multiple beams and the PSCCH that provides the second stage SCI format and the associated PSSCH is of unicast type, the transmission/reception beam for each PSCCH that provides the first stage SCI format is same as the transmission/reception beam for the PSCCH that provides the second stage SCI format and of the associated PSSCH. When the PSCCH that provides the first stage SCI format is transmitted/received over multiple beams and the PSCCH that provides the second stage SCI format and the associated PSSCH is not of unicast type (e.g., it is of broadcast type or groupcast type), the first stage SCI format can indicate a beam (TCI state) for the transmission/reception of the PSCCH with the second stage SCI format and of the associated PSSCH.

Figure 25:
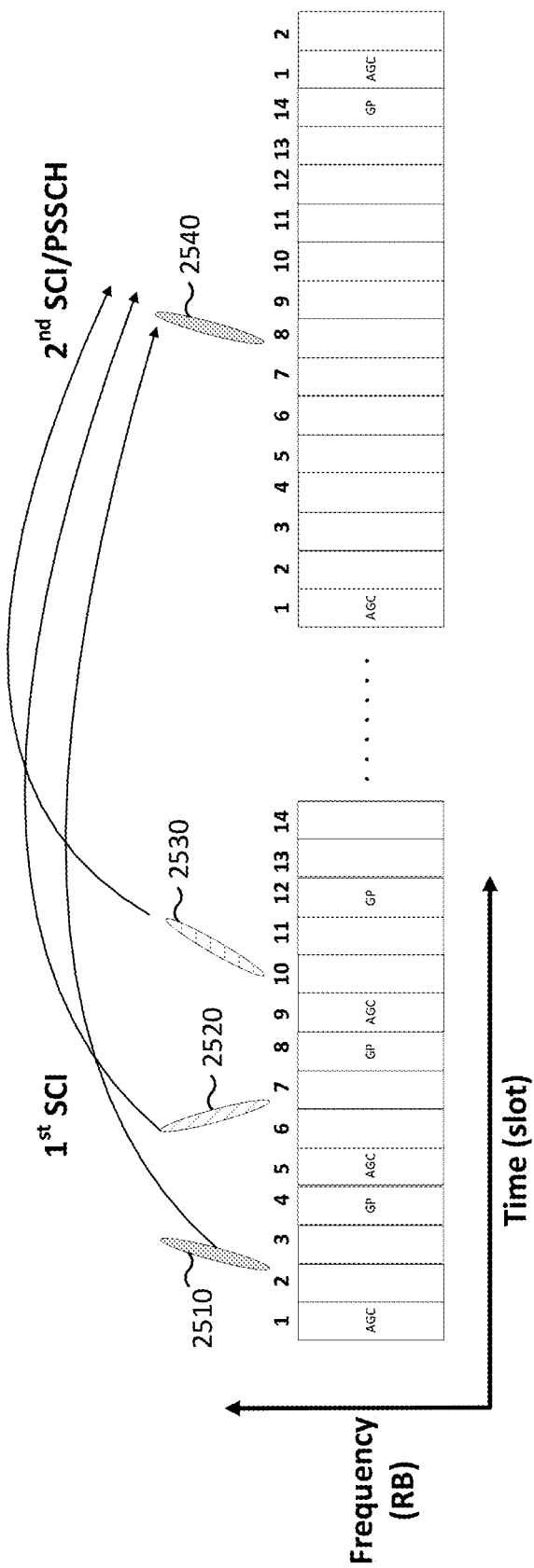
FIG. 25 illustrates a first stage SCI format indicating a beam for transmission/reception of a PSCCH with the second SCI format and of an associated PSSCH according to various embodiments of the present disclosure.

FIG. 25 illustrates a first stage SCI format indicating a beam for transmission/reception of a PSCCH with the second SCI format and of an associated PSSCH according to various embodiments of the present disclosure. In particular, the PSCCH that provides the first stage SCI format is transmitted using three beams 2510, 2520, and 2530. The first stage SCI format indicates one beam 2540 of the PSCCH transmission that provides the second stage SCI format and of the associated PSSCH transmission. The embodiment of the first stage SCI format shown in FIG. 25 is for illustration only. Other embodiments can be used without departing from the scope of the present disclosure.

Figure 26:
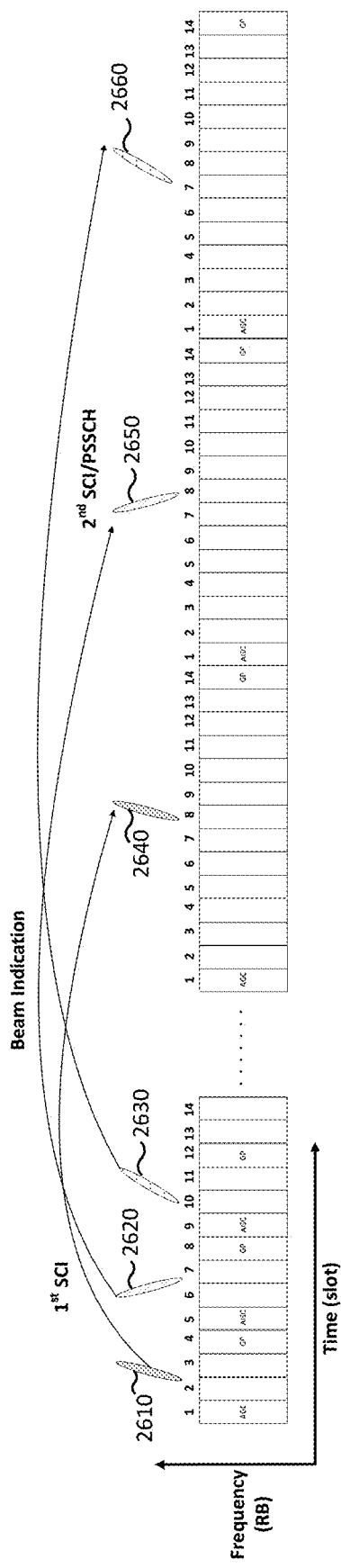
FIG. 26 illustrates a first stage SCI format indicating multiple beams for a transmission of a PSCCH with a second stage SCI format and of an associated PSSCH according to various embodiments of the present disclosure.

As another example, FIG. 26 illustrates a first stage SCI format indicating multiple beams for a transmission of a PSCCH with a second stage SCI format and of an associated PSSCH according to various embodiments of the present disclosure. In particular, a PSCCH that provides the first stage SCI format can be transmitted using multiple beams including three beams 2610, 2620, and 2630. The first beam 2610 indicates the first beam for transmission of a PSCCH with the second stage SCI format and of an associated PSSCH 2640, the second beam 2620 indicates the second beam for transmission of a PSCCH with the second stage SCI format and of an associated PSSCH 2650, and the third beam 2630 indicates the third beam for transmission of a PSCCH with the second stage SCI format and of an associated PSSCH 2660. The association among the beams can be indicated by the first stage SCI format, or configured by RRC signaling, or be predetermined in the system operation. The embodiment of the first stage SCI format shown in FIG. 26 is for illustration only. Other embodiments can be used without departing from the scope of the present disclosure.

The transmission beam that the first SCI format indicates can be in the form of TCI-state that contains parameters for configuring a quasi co-location relationship between the sidelink reference signals and the DM-RS ports of the PSCCH with the second stage SCI format and of the associated/scheduled PSSCH. The quasi co-location relationship can be configured by higher layer parameter qcl-Type for the sidelink reference signal. The sidelink reference signals can be determined either by a SSB-index for a SS/PBCH block or by a CSI-RS resource ID for a CSI-RS.

The TCI state field in the first state SCI format indicates the TCI state for the transmission of the PSCCH with the second stage SCI format and of the scheduled PSSCH. A UE uses the TCI-State value indicated by the value of the TCI state field in the detected first stage SCI format for determining an antenna port quasi co-location for the reception of the PSCCH with the second stage SCI format or of the PSSCH, if a time between the reception of the PSCCH with the first stage SCI format and the reception of the PSCCH with the second stage SCI format or of the PSSCH is equal to or greater than a threshold provided by higher layer parameter Threshold-Sched-Offset. If the time between the reception of the PSCCH with the first stage SCI format and the PSCCH with second stage SCI format or the PSSCH is less than the threshold provided by Threshold-Sched-Offset, the UE can assume that the DM-RS ports of the PSCCH with the second stage SCI format or of the PSSCH are quasi co-located with the RS(s) in the TCI state with respect to the QCL parameter(s) used for the first stage SCI quasi co-location indication.

Figure 27:
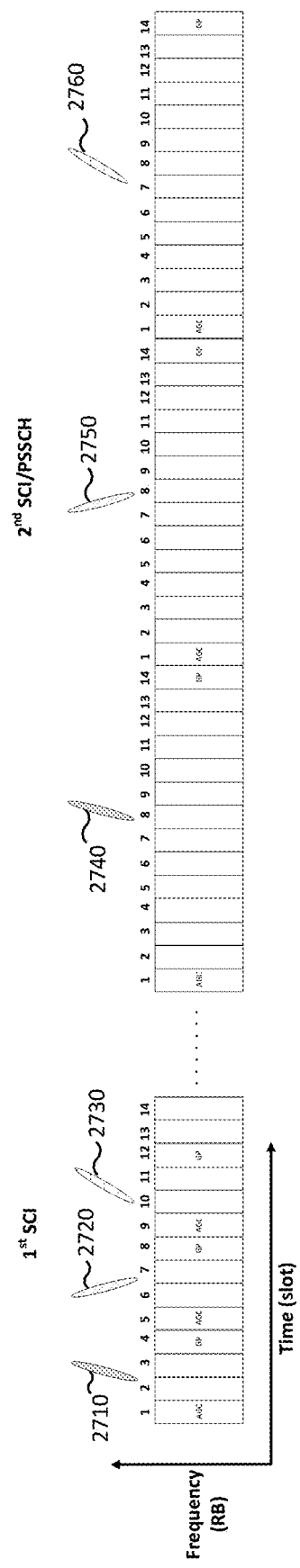
FIG. 27 illustrates a determination for a beam for a reception of a PSCCH with a second stage SCI format or of a scheduled PSSCH based on a beam for a reception of a PSCCH with a first SCI format according to various embodiments of the present disclosure.

FIG. 27 illustrates a determination for a beam for a reception of a PSCCH with a second stage SCI format or of a scheduled PSSCH based on a beam for a reception of a PSCCH with a first SCI format according to various embodiments of the present disclosure. The embodiment of the transmission beam shown in FIG. 27 is for illustration only. Other embodiments can be used without departing from the scope of the present disclosure.

A UE receives a PSCCH that provides a first stage SCI format using different beams including three beams 2710, 2720, and 2730. The first beam 2710 is associated with a reception of a PSCCH that provides the second SCI format or of a scheduled PSSCH 2740. The second beam 2720 is associated with a reception of a PSCCH that provides the second SCI format or of a scheduled PSSCH 2750. The third beam 2730 is associated with a reception of a PSCCH that provides the second stage SCI format or of a scheduled PSSCH 2760. Accordingly, the three beams 2710, 2720, and 2730 are associated with the three beams for the reception of a PSCCH that provides the second stage SCI format or of the scheduled PSSCH 2740, 2750, 2760, respectively, when a time between the reception of the PSCCH that provides the first stage SCI format and the reception of the PSCCH that provides the second stage SCI format or of the scheduled PSSCH is less than a threshold provided by higher layer parameter Threshold-Sched-Offset.

Various embodiments of the present disclosure provide mechanisms for beam measurement and reporting. For example, before the transmission and reception beam is aligned between the transmitter UE and the receiver UE, respectively, a CSI-RS is configured and transmitted using multiple beams by the transmitter UE to the receiver UE. The receiver UE performs beam measurement, using the received CSI-RS, and reports the beam measurement result to the transmitter UE. For example, the beam measurement result can be a CSI-RS resource index resulting to a larger SINR if CSI-RS is transmitted for beam measurement and reporting. The receiver UE can select N CRIs and corresponding L1-RSRP values to report from a set of CSI-RS resources, for example according to a descending SINR value starting from the largest.

In embodiments where the CSI-RS transmission/reception is contained in resources used for PSCCH/PSSCH transmission/reception, the transmitter UE performs resource allocation within the resource for CSI-RS transmission using multiple beams. Similar, the receiver UE performs resource allocation for a CSI report that includes CSI reports for one or more for CSI-RS receptions using the multiple beams. The resource allocation procedure for CSI-RS transmission using multiple beams or for a CSI report in response to CSI-RS reception over the multiple beams can be same as for a procedure for a resource allocation for a PSCCH/PSSCH transmission/reception using multiple beams.

Various embodiments of the present disclosure provide mechanisms for beam indication for a PSFCH transmission. The beam of the PSFCH transmission can be indicated in several ways.

In some embodiments, a UE can transmit a PSFCH using multiple beams. For example, the UE can transmit the PSFCH using multiple beams for groupcast or when the UE does not acquire a beam used for a corresponding PSCCH/PSSCH reception by beam training for unicast.

In some embodiments, a UE transmits a PSFCH using a beam that the UE derives from a corresponding reception beam of a PSCCH/PSSCH reception associated with the PSFCH transmission. This is typically referred to as beam correspondence.

In some embodiments, a UE that transmits a PSCCH/PSSCH indicates a beam in the SCI format provided by the PSCCH for the UE that receives the PSCCH/PSSCH to use for transmission of an associated PSFCH. The UE that transmits the PSCCH/PSSCH can derive a beam for the associated PSFCH transmission by beam training based on beam measurements of the reference signals transmitted by the UE that transmits the PSFCH.

Figure 28:
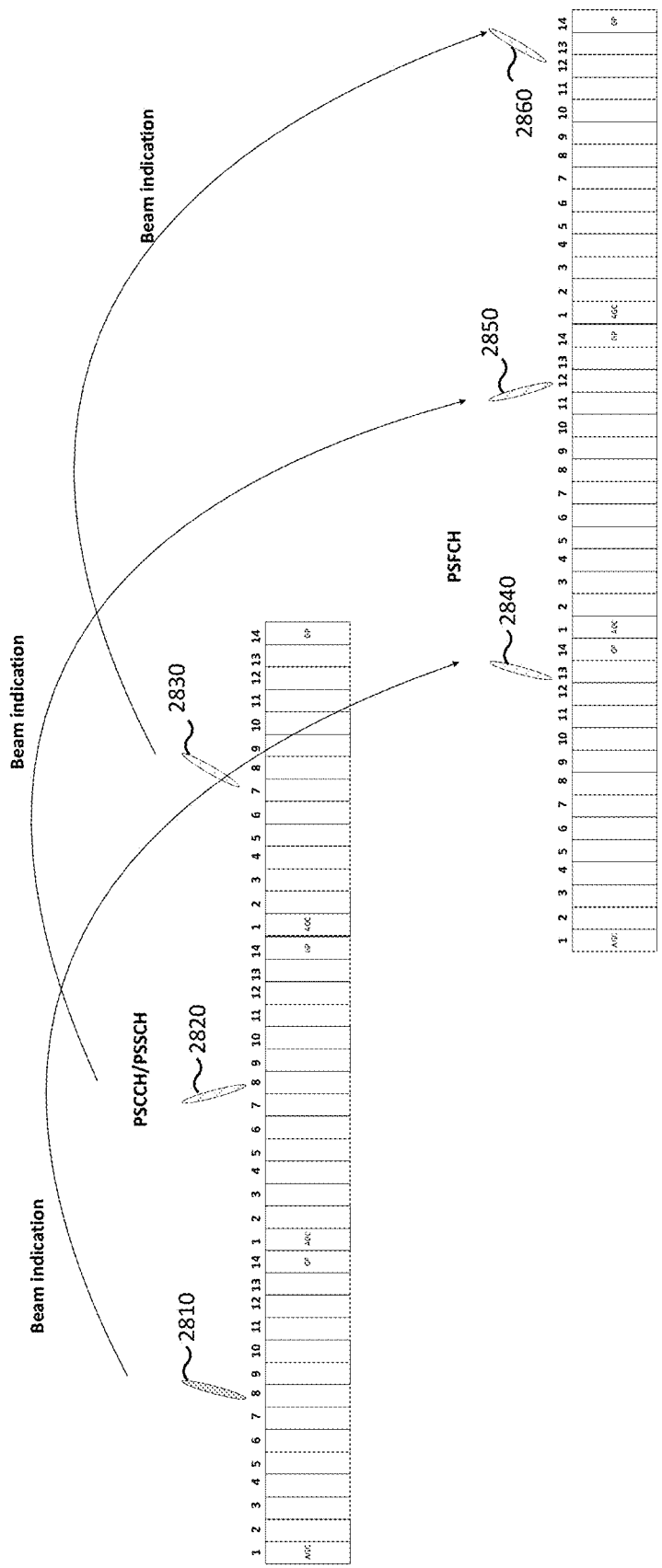
FIG. 28 illustrates an indication of a PSFCH transmission beam by SCI format according to various embodiments of the present disclosure.

FIG. 28 illustrates an indication of a PSFCH transmission beam by SCI format according to various embodiments of the present disclosure. The embodiment of the PSFCH beam indication shown in FIG. 28 is for illustration only. Other embodiments can be used without departing from the scope of the present disclosure.

As shown in FIG. 28, the PSCCH/PSSCH reception is by using three beams 2810, 2820, and 2830 that correspond to three beams of the PSFCH transmission 2840, 2850, and 2860, respectively. Accordingly, the beam of the PSFCH transmission can be indicated by the beam of the associated PSCCH/PSSCH reception. In some embodiments, the beam indication can be by a CSI-RS resource index. The embodiment of the PSFCH beam indication shown in FIG. 28 is for illustration only. Other embodiments can be used without departing from the scope of the present disclosure.

In some embodiments, the UE that transmits the PSCCH/PSSCH indicates in a reservation signal a beam for the UE that receives the PSCCH/PSSCH to use for the associated PSFCH transmission. For example, the UE that transmits PSCCH/PSSCH can derive the beam of the associated PSFCH transmission by beam training based on beam measurements from received reference signals that are transmitted by the UE that transmits the PSFCH. The beam indication can be a CSI-RS resource index.

In some embodiments, higher layers can configure a list of reference signal IDs, such as CSI-RS resource IDs, to be associated with a PSFCH resource and a MAC-CE or a SCI format scheduling a PSSCH reception can indicate one of the reference signal IDs for the UE transmitting the PSFCH to determine a beam for the PSFCH transmission. Alternatively, instead of reference signal IDs, higher layers can configure a set of TCI states and the SCI format or a MAC CE can indicate a TCI state from the set of TCI states for the PSFCH transmission.

Various embodiments of the present disclosure provide mechanisms for a resource allocation. For example, sidelink resources can be reserved and used by a UE for PSCCH/PSSCH transmission. When the PSCCH/PSSCH transmission is unicast, the UE allocates resources for PSCCH/PSSCH transmission using one beam. When the PSCCH/PSSCH transmission is a broadcast/groupcast, the UE allocates resources for PSCCH/PSSCH transmission using multiple beams. Before a beam is aligned between the transmitter UE and the receiver UE for unicast, the transmitter UE can allocate resources for PSCCH/PSSCH transmission using multiple beams.

In some embodiments, resource allocation for PSCCH/PSSCH transmission using multiple beams can be performed separately per beam.

In some embodiments, for sidelink measurements, when a UE performs a sidelink measurement for excluding resources, the UE applies a beam for a reception of a sidelink signal used to measure a sidelink RSRP. When performing sidelink measurement for selecting resources, the UE applies the beam for the reception of the sidelink signal to measure a sidelink RSSI. For example, as shown in FIG. 27, RSRP/RSSI can be calculated based on each corresponding beam for the sidelink signal reception.

In some embodiments, a UE can perform resource exclusion separately for each beam used for reception. If a resource is excluded for reception using a first beam, the resource may not be excluded for reception using a second beam. If a resource is not excluded for reception using a first beam, but is not selected for transmission, the resource can be used for reception with a second beam unless the resource is excluded by the second receiver beam. A resource selected for reception using a first beam is not located in a same slot, or symbol of a slot, as a resource selected for reception using a second beam.

Figure 29:
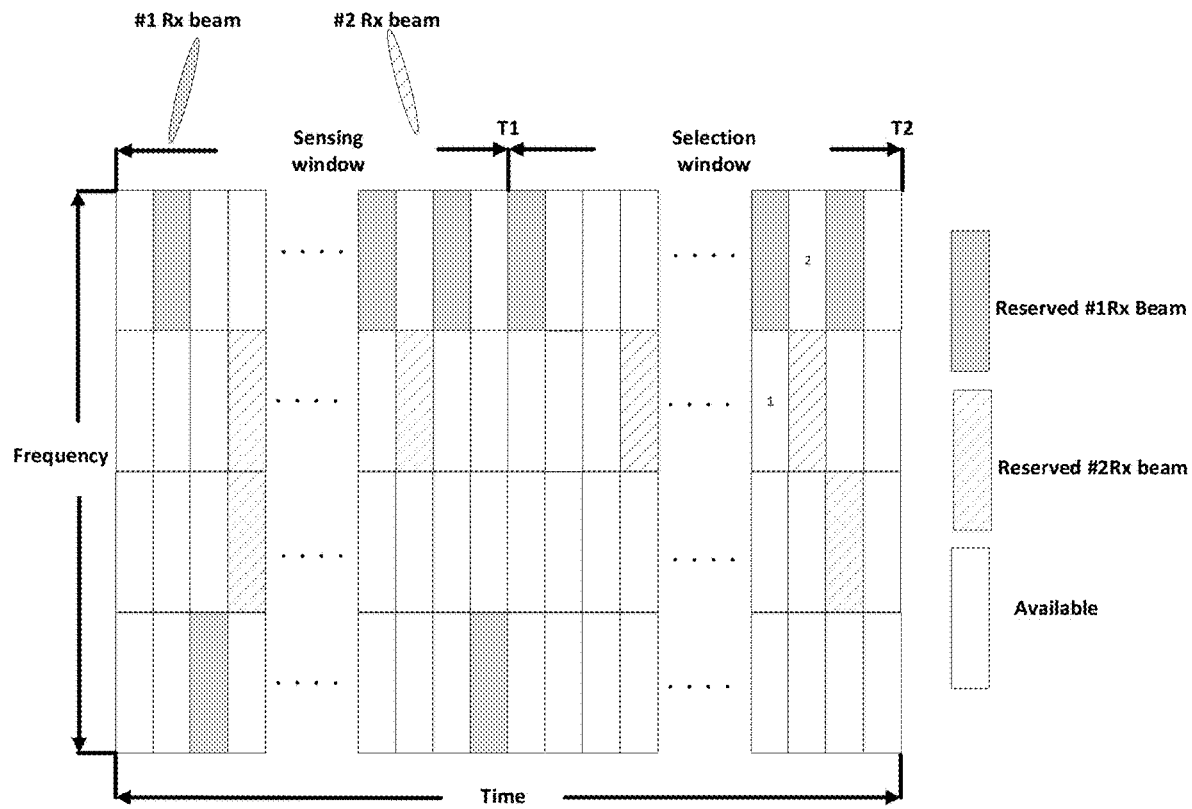
FIG. 29 illustrates a resource selection for a PSCCH/PSSCH transmission using multiple beams according to various embodiments of the present disclosure.

FIG. 29 illustrates a resource selection for a PSCCH/PSSCH transmission using multiple beams according to various embodiments of the present disclosure. The embodiment of the resource selection for PSCCH/PSSCH transmission using multiple beams shown in FIG. 29 is for illustration only. Other embodiments can be used without departing from the scope of the present disclosure.

As shown in FIG. 29, resource 1 is not excluded for reception using a first beam but the resource 1 is not selected for transmission with a first beam. Therefore, resource 1 can be used for transmission with a second beam. Similar, resource 2 is not excluded for reception using a second beam but resource 2 is not selected for transmission with a second beam. Therefore, resource 2 can be used for transmission using a third beam.

In some embodiments, the UE can transmit a PSFCH using multiple beams. When the UE transmits the PSFCH using multiple beams, a resource for each beam for the PSFCH transmission can be associated with the corresponding beam for a PSCCH/PSSCH reception and the UE may not need to separately perform resource allocation for each PSFCH.

Figure 30:
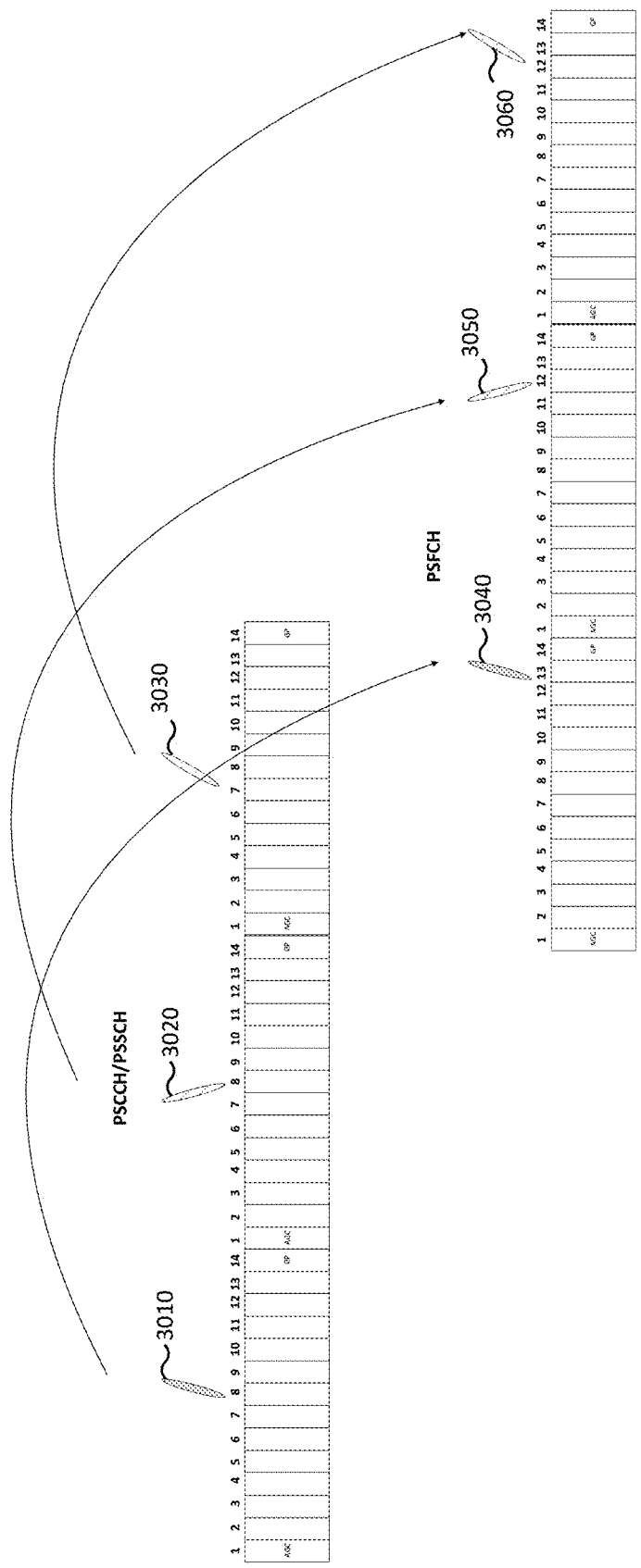
FIG. 30 illustrates a determination of resources for a PSFCH transmission using multiple beams based on a beam for an associated PSCCH/PSSCH reception according to various embodiments of the present disclosure.

FIG. 30 illustrates a determination of resources for a PSFCH transmission using multiple beams based on a beam for an associated PSCCH/PSSCH reception according to various embodiments of the present disclosure. The embodiment of the resource determination for a PSFCH transmission using multiple beams shown in FIG. 30 is for illustration only. Other embodiments can be used without departing from the scope of the present disclosure.

As shown in FIG. 30, the PSCCH/PSSCH reception includes three beams 3010, 3020, and 3030 that correspond to PSFCH resources 3040, 3050, and 3060, respectively. Accordingly, the PSFCH resources for each beam used for a PSFCH transmission are associated with a beam for the corresponding PSCCH/PSSCH reception.

Figure 31:
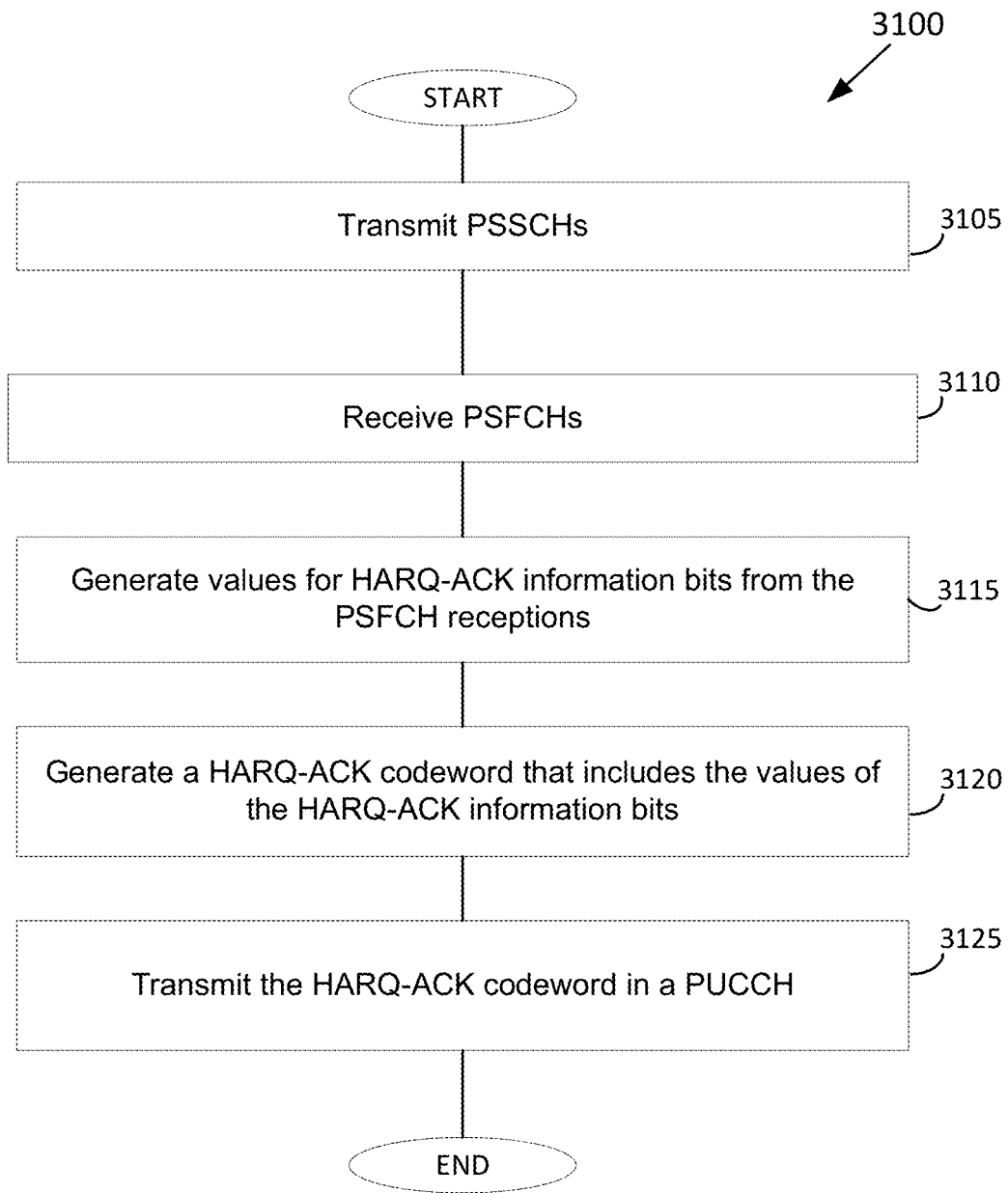
FIG. 31 illustrates an example of a method for a UE to provide HARQ-ACK information according to embodiments of the present disclosure.

FIG. 31 illustrates an example of a method 3100 for a UE to provide HARQ-ACK information according to embodiments of the present disclosure. For example, the method 3100 may be performed by a UE 116 in connection with another UEs 118 and a BS 102 as illustrated in FIG. 1. The embodiment of the method 3100 illustrated in FIG. 31 is for illustration only. FIG. 31 does not limit the scope of the present disclosure to any particular implementation.

The method 3100 begins with the UE transmitting PSSCHs (operation 3105). For example, in operation 3105, each of the PSSCH transmissions by the UE provides a TB to other UE(s).

In various embodiments, the UE may have previously received, for example from a BS, a PDCCH in a first slot, where the PDCCH provides a DCI format for scheduling at least one of the PSSCH transmissions in a second slot and includes a value for a time gap field. The UE can then use the value of the time gap field to determine a time for a second slot that is after the first slot by a number of slots indicated by the value of the time gap field. In some embodiments, the scheduling information provided by the DCI format is applicable for more than one of the PSSCH transmissions. In some embodiments, two consecutive PSSCH transmissions are in slots separated by the number of slots.

The DCI format may provide information for scheduling at least one of the PSSCH transmissions and includes a first HARQ process number field having a first value. The UE may then transmit, for example to the other UE(s), a PSCCH that provides a SCI format that provides information for scheduling the at least one PSSCH transmission and includes a second HARQ process number field with a second value that is determined by the UE based on a first value of the first HARQ process number field. In various embodiments, the UE may also receive, for example via a PDCCH, a configuration for a maximum number of PSSCH transmissions that provide a same TB.

In various embodiments, the UE may receive, for example from a BS, a first PDCCH that provides a first DCI format and a second PDCCH that provides a second DCI format. The DCI formats schedule PSSCH transmissions using different radio access technologies (RATs). For example, the first DCI format provides information for scheduling at least a first of the PSSCH transmissions according to a NR RAT and the second DCI format provides information for scheduling at least a second of the PSSCH transmissions according to a LTE RAT. In one example the first DCI format and the second DCI format have a same size and either the first DCI format or the second DCI format includes a number of bits having a predetermined value of 0. The first DCI format includes a number of CRC bits and the second DCI format includes the same number of CRC bits. The CRC bits of the first DCI format may be scrambled by first RNTI bits and the CRC of the second DCI format may be scrambled by second RNTI bits.

Thereafter, the UE receives PSFCHs (operation 3110). For example, the PSFCHs are transmitted from the other UE(s) that received the PSCCH/PSSCHs. The PSFCH receptions are mapped to respective PSSCH transmissions. For example, each PSFCH reception is in response to a PSSCH transmission.

The UE then generates values for HARQ-ACK information bits from the PSFCH receptions, respectively (operation 3115). For example, in operation 3115, the UE generates one HARQ-ACK information bit per PSFCH reception. Each HARQ-ACK information bit has a value corresponding to a decoding outcome for a TB in a PSSCH reception. Additionally, the UE associates a HARQ-ACK information bit determination from a PSFCH reception based on a corresponding PSSCH transmission. The UE may also determine that no PSFCH corresponding to one or more of the PSSCH transmissions has been received. Then, the UE generates a HARQ-ACK information bit with a NACK value indicating that the TB in the corresponding PSSCH transmission was not received by the other UE.

The UE then generates a HARQ-ACK codeword that includes the values of the HARQ-ACK information bits arranged in a predetermined order (operation 3120). For example, in operation 3120, the predetermined order may be an ascending order of corresponding PSSCH transmissions in time, or the predetermined order may be an ascending order of PDCCH receptions with DCI formats scheduling resources for the respective PSSCH transmissions as received by the UE in time.

Thereafter, the UE transmits the generated HARQ-ACK codeword in a PUCCH, for example to the BS (operation 3125).

The above flowchart illustrates an example of a method 3100 that can be implemented in accordance with the principles of the present disclosure and various changes could be made to the method 3100 illustrated in the flowcharts. For example, while shown as a series of steps, various steps in each figure could overlap, occur in parallel, occur in a different order, or occur multiple times. In another example, steps may be omitted or replaced by other steps. In other examples, corresponding and complementary methods can be performed by the other UE 118 and the BS 102.

Although the present disclosure has been described with an example embodiment, various changes and modifications can be suggested by or to one skilled in the art. It is intended that the present disclosure encompass such changes and modifications as fall within the scope of the appended claims.

What is claimed is:

1. A method for a user equipment (UE) to transmit a first sidelink (SL) channel, the method comprising:
   transmitting a SL channel state information reference signal (SL CSI-RS) using a number of beams;
   receiving a first measurement report that includes a first number of pairs of SL CSI-RS resource identities (IDs) and corresponding Layer-1 reference signal received power (L1-RSRP) values;
   determining, based on the first measurement report, a first beam for a transmission of the first SL channel; and
   transmitting the first SL channel using the first beam.

2. The method of claim 1, wherein the first SL channel is a physical sidelink control channel (PSCCH) or a physical sidelink shared channel (PSSCH).

3. The method of claim 1, further comprising:
   determining a second beam for a reception of a physical sidelink feedback channel (PSFCH) based on the first beam; and
   receiving the PSFCH based on the second beam.

4. The method of claim 1, further comprising:
   transmitting a second SL channel that provides a SL transmission configuration (TCI) state.

5. The method of claim 1, further comprising:
   receiving a number of SL CSI-RS;
   determining, based on the reception of the number of SL CSI-RS, a second measurement report that includes a second number of pairs of SL CSI-RS IDs and corresponding L1-RSRP values; and
   transmitting the second measurement report.

6. The method of claim 1, further comprising:
   receiving a second SL channel that provides a SL transmission configuration (TCI) state;
   determining, based on the SL TCI state, a second beam; and
   receiving, using the second beam, a physical sidelink control channel (PSCCH) or a physical sidelink shared channel (PSSCH).

7. The method of claim 6, further comprising:
   receiving information for a time threshold, wherein a first symbol of the PSSCH reception or of the PSCCH reception is after a last symbol of the second SL channel reception by a time that is larger than or equal to the time threshold.

8. The method of claim 6, wherein the SL TCI state includes a SL CSI-RS resource ID for a SL CSI-RS associated with the second beam.

9. The method of claim 1 further comprising:
   transmitting a number of SL signals in a slot, wherein:
      each SL signal from the number of SL signals is transmitted:
         with a corresponding beam, and
         per symbol over a plurality of symbols in the slot, and
      a guard symbol follows a last symbol from the plurality of symbols.

10. The method of claim 9, wherein each SL signal from the number of SL signals is associated with a beam for a physical sidelink control channel (PSCCH) transmission or a physical sidelink shared channel (PSSCH) transmission.

11. A user equipment (UE) comprising:
   a transceiver configured to:
      transmit a sidelink (SL) channel state information reference signal (SL CSI-RS) using a number of beams;
      receive a first measurement report that includes a first number of pairs of SL CSI-RS resource identities (IDs) and corresponding Layer-1 reference signal received power (L1-RSRP) values; and
   a processor configured to determine, based on the first measurement report, a first beam for a transmission of a first SL channel,
   wherein the transceiver is further configured to transmit the first SL channel using the first beam.

12. The UE of claim 11, wherein the first SL channel is a physical sidelink control channel (PSCCH) or a physical sidelink shared channel (PSSCH).

13. The UE of claim 11, wherein:
   the processor is further configured to determine a second beam for a reception of a physical sidelink feedback channel (PSFCH) based on the first beam; and
   the transceiver is further configured to receive the PSFCH based on the second beam.

14. The UE of claim 11, wherein the transceiver is further configured to transmit a second SL channel that provides a SL transmission configuration (TCI) state.

15. The UE of claim 11, wherein:
   the transceiver is further configured to receive a number of SL CSI-RS;
   the processor is further configured to determine, based on the reception of the number of SL CSI-RS, a second measurement report that includes a second number of pairs of SL CSI-RS IDs and corresponding L1-RSRP values; and
   the transceiver is further configured to transmit the second measurement report.

16. The UE of claim 11, wherein:
   the transceiver is further configured to receive a second SL channel that provides a SL transmission configuration (TCI) state;

the processor is further configured to determine, based on the SL TCI state, a second beam; and the transceiver is further configured to receive, using the second beam, a physical sidelink control channel (PSCCH) or a physical sidelink shared channel (PSSCH).

17. The UE of claim 16, wherein the transceiver is further configured to receive information for a time threshold, wherein a first symbol of the PSSCH reception or of the PSCCH reception is after a last symbol of the second SL channel reception by a time that is larger than or equal to the time threshold.

18. The UE of claim 16, wherein the SL TCI state includes a SL CSI-RS resource ID for a SL CSI-RS associated with the second beam.

19. The UE of claim 11, wherein:

the transceiver is further configured to transmit a number of SL signals in a slot, wherein:

each SL signal from the number of SL signals is transmitted:

with a corresponding beam, and per symbol over a plurality of symbols in the slot, and a guard symbol follows a last symbol from the plurality of symbols.

20. The UE of claim 19, wherein each SL signal from the number of SL signals is associated with a beam for a physical sidelink control channel (PSCCH) transmission or a physical sidelink shared channel (PSSCH) transmission.

* * * * *